United States Patent [19]

Randig

[11] Patent Number: 4,683,474
[45] Date of Patent: Jul. 28, 1987

[54] SURVIVABLE GROUND BASE SENSOR

[75] Inventor: George W. Randig, Harvard, Mass.

[73] Assignee: The United States of America as represented by the Secretary of the Air Force, Washington, D.C.

[21] Appl. No.: 705,827

[22] Filed: Feb. 26, 1985

[51] Int. Cl.$^4$ .......................... H01Q 3/22; H01Q 1/04
[52] U.S. Cl. .................................... 342/368; 343/719; 342/59
[58] Field of Search ............... 343/368, 371, 372, 719, 343/824, 872, 873, 5 R, 16 R, 7.7; 342/27, 88, 147, 157, 146, 59

[56] References Cited

U.S. PATENT DOCUMENTS

| | | | |
|---|---|---|---|
| 3,346,864 | 10/1967 | Harmon | 343/719 |
| 3,587,097 | 6/1971 | Stull, Jr. | 343/7.7 |
| 3,594,798 | 7/1971 | Leydorf | 343/719 |
| 3,775,772 | 11/1973 | Carrell | 343/719 |
| 3,790,949 | 2/1974 | McGraw | 343/719 |
| 3,803,616 | 4/1974 | Kopf et al. | 343/719 |
| 3,877,033 | 4/1975 | Unz | 343/844 |
| 4,278,978 | 7/1981 | Easterling et al. | 343/383 |

OTHER PUBLICATIONS

Cantrell and Grindlay, "Multiple Site Radar Tracking System", IEEE Intl. Radar Conference, Apr. 1980, pp. 348–354.

Skonik, *Intro. to Radar Systems*, 2nd Ed. 1980, pp. 29–30.

*Primary Examiner*—Theodore M. Blum
*Assistant Examiner*—Gregory C. Issing
*Attorney, Agent, or Firm*—William Stepanishen; Donald J. Singer

[57] ABSTRACT

The survivable ground base sensor is the basic element of a land-based distributed radar that consists of 60 or more individual subarrays, which are located in either a straight line or on the perimeter of a 200 nmi diameter circle in the north central U.S. At least 10 nmi separation is provided between individual subarrays. Each subarray is self-contained with emergency power and is operated unattended. There is no need for any interconnection between subarrays so that the survivability is improved, and there is no limit to the number of subarrays used except that imposed by cost and the desire for greater survivability. Since the spacing between subarrays is 10 nmi, a direct hit on one subarray will not damage an adjacent one so that a separate re-entry vehicles must be targeted to each subarray.

9 Claims, 18 Drawing Figures

SURVIVABLE GROUND BASE SENSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a steerable radar apparatus, and in particular to a survivable ground base steerable array antenna elements.

It has become a matter of prime importance in defense to provide hardened sites for our missiles. The philosophy behind the use of these weapons is one of retaliation. It is obvious therefore that these weapons must be protected as far as possible against the first strike situation. However, the protection of the weapons alone would be of minimal value if command communications and advance warning radar systems were lost during an initial attack. It is, therefore, with great need that hardened sites be provided in order to protect radar warning system in order to maintain an effective tactical warning system in a post attack situation.

In a conventional phased array which coherently combines signals from all array elements, spacing radiating elements apart by more than a fraction of a wavelength produces numerous grating lobes. This precludes any practical use of widely spaced elements. The distributed array of the present invention uses noncoherent addition of radar return signals that are received at each subarray from signals that are transmitted by all of the subarrays. In the noncoherent array approach, the 60 subarrays can be widely spaced yet not produce these objectionable grating lobes.

A novel form of time-delay steering is used to position the array's beam in space. Each subarray transmits a single pulse at a different frequency, and the time of transmission is adjusted so that all 60 pulses arrive at some selected azimuth and range in time coincidence. If there is a target at this range and azimuth, the 60 time coincident pulses are reflected back to the array of 60 subarrays. Each subarray has a receiver that contains 60 separate channels tuned to the 60 frequencies that are transmitted by all the subarrays. The output of these channels are noncoherently added producing a detectable signal. The signal-to-noise ratio in each of the 60 individual channels is too small to insure reliable detection, but noncoherent addition of all channels provides sufficient signal-to-noise ratio so that the probability of detection of the target is over 90% at each subarray. Target reports are generated at each subarray and connected to the Tactical Warning system through a suitable communications architecture.

SUMMARY OF THE INVENTION

The present invention utilizes a hardened radar system wherein the transmitter unit has subarray of elements built into a concrete pyramid. Each subarray transmits a pulse in time sequence that adds coherently in the direction of radiation. The radar system which operates in the microwave frequency range, utilizes a large number of subarrays that are positioned a large distance apart, typically one to ten miles. The array is steerable and may be in the form of either a linear array or a circular array. If one of the antenna arrays is destroyed by a nuclear explosion, the other arrays are able to continue operating since all subarrays of the entire radar system are built into hardened concrete pyramids or steel, semi-hardened, shelters.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
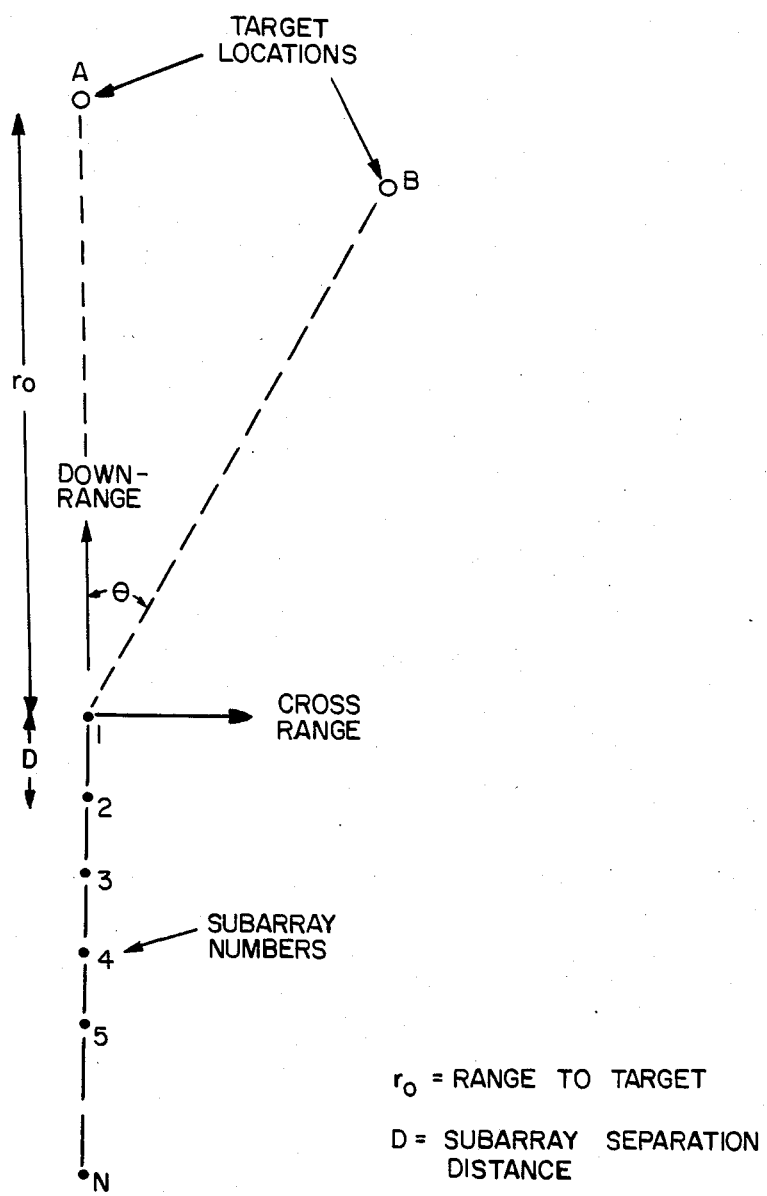
FIG. 1 is a plan view of a linear array of the ground base sensor apparatus according to the present invention.

Turning now to FIG. 1, there is shown a schematic representation of a linear array radar that uses a number of dispersed radiating elements. A linear subarray configuration is used here to aid in the explanation of principles involved. A circular configuration is the preferred approach and will be described later. Each subarray unit comprises a steerable array which is protected by a concrete pyramid with all associated electronics located below ground. The linear array of subarrays are arranged as shown and the direction of radiation is initially in line with the array. Each element is separated by a large distance, D, which is typically on order of one to ten miles so as to require one reentry vehicle to be targeted to each element to destroy the array. The fundamental concept is to require a hostile entity to expend large resources to destroy the array instead of the present situation where one reentry vehicle can destroy an entire installation.

A transmitter in each subarray transmits a pulse in a time sequence and at a different frequency that adds coherently in the direction of radiation. Energy reflected from a target, T, is received by each element and the time delays, D, 2D, . . . ND, are added to obtain coherent addition. If the target is off the desired direction of radiation, neither the transmitted nor received energy adds coherently and the amplitude of the return signal follows a triangular response in azimuth. In order to steer the pattern, the individual element patterns $G_1$, $G_2$, and $G_N$, are steered to the desired azimuth and the transmit and receive time delays adjusted to maximize the array gain in the desired direction. This also avoids the problem of coherent addition by a target at either side of boresight (i.e., along the array) since the time delay compensation will favor either the left or right quadrant. Monopulse in the element pattern is used to sense left or right when the beam is steered along boresight. A limited azimuth scan may be utilized in order to avoid grating lobes as the time delays aproach zero and the scan is toward broadside. The gain of the system is product of the array gain, N, and element gain, $G_{EL}$ or:

$$G = 10 \log N + G_{EL}$$

Figure 2:
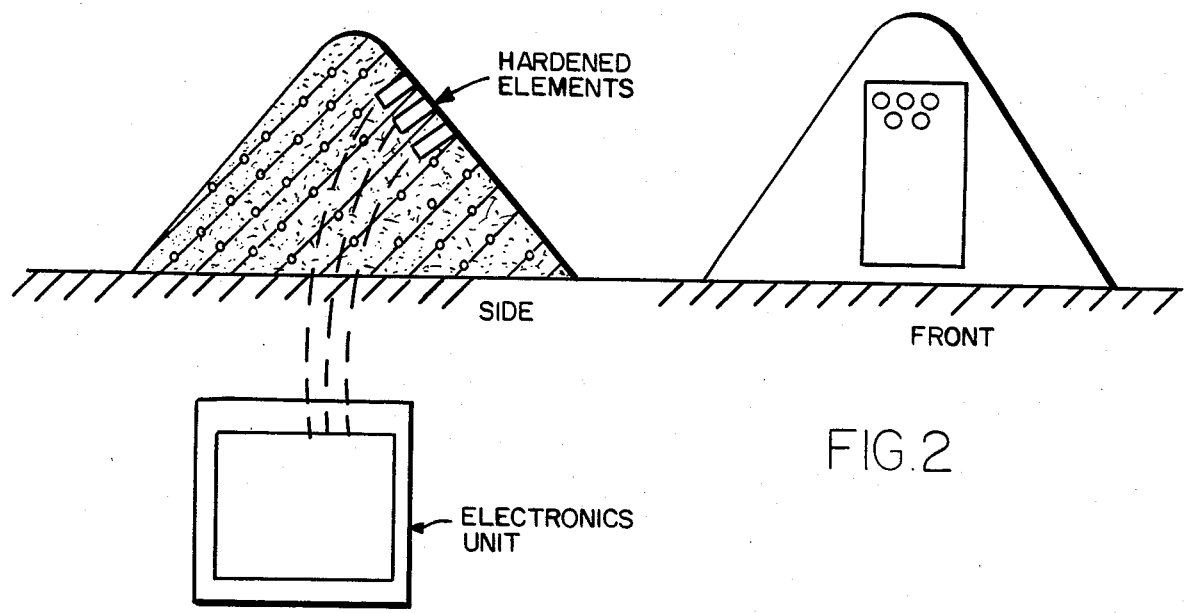
FIG. 2 is a front and side view respectively of the hardened ground base sensor apparatus.

In FIG. 2, there is shown a concrete pyramid in which there is contained the subarray of a steerable array. The concrete pyramid is shaped so as to allow debris to fall from the face to the ground. The radiating elements which are hardened are flush with the concrete pyramid face. In order arrive at some typical values, assume a total gain of 40 dB is needed at UHF. It is desired to have positive signal-to-noise ratios on receive at each element so as to achieve an integrated signal-to-noise ratio of 18–20 dB on reentry vehicle size targets. Therefore, the gain of the element array should be approximately 22 dB. The array gain then is 17 dB for an N of 60. For an array gain of 17 dB and a desired signal-to-noise ratio of 20 dB, the signal-to-noise at each high gain element is 3 dB, and thus adequate for a digital processor to compensate for the time delays and coherently integrate the returns. Each element array might contain 50 elements in a 4×20 foot rectangular configuration. If each element is driven by a UHF solid state module, then the total of 3,000 modules corresponds to a 5 dB grown PAVE PAWS radar (i.e., 5 dB corresponds to 1.6 times the number of modules in a 0 dB PAVE PAWS radar) which is about the right order of magnitude for a TW/AA radar. Each high gain element array produces a 33° beam in azimuth and 6.6° in elevation. The azimuth beamwidth of the array is dependent on the pulselength. for compressed pulselength of 0.1 μsec. The one way half power beamwidth can be found:

$$\sin^2 \theta_B = \frac{2\Delta R}{DN} \quad \Delta R = \frac{c\tau}{2}$$

for D=6,000 ft., N=60, ΔR=50 ft., $\theta_B$ is 0.95°. This time delay steered, end fire type array has other features such as: (1) the distances between the high gain array elements can be varied to accomodate terrain problems; (2) the bandwidth of the array is in theory as wide as that limited by the high gain elements; and (3) as individual elements are destroyed array performance degrades incrementally, not totally. A ground-based system that is distributed over a wide area has the advantage that many nuclear weapons are required to nullify the system rather than the one small weapon that can nullify current radars.

Traditionally, it has not been possible to disperse a radar (other than to proliferate tactical warning systems such as PAVE PAWS) without experiencing numerous grating lobes in space, this is an intolerable situation when position estimating and directive gain are essential features. The present apparatus provides a method of incorporating time delay steering that permits wide separations between small subarray radars; separations that are wide enough to require a single weapon be targeted at each subarray. The number of subarrays in the example used here to describe the technique is 60, however, more are conceivable depending on the upper bound placed on the initial acquisition cost.

Figure 3:
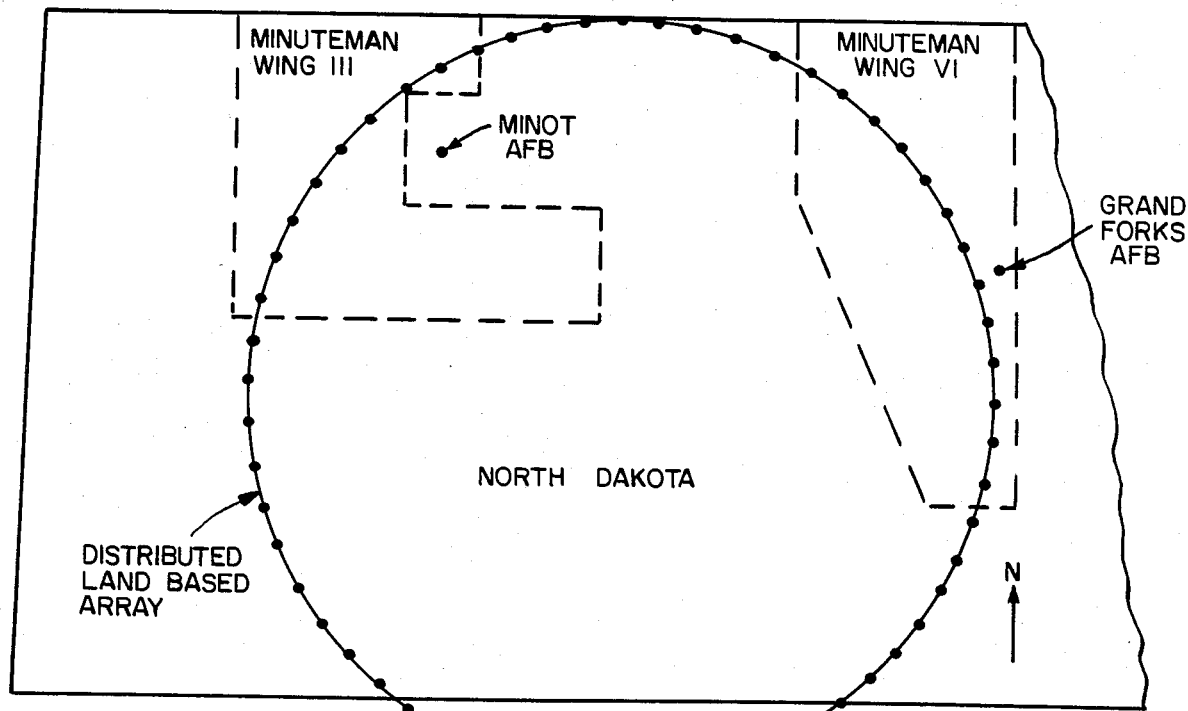
FIG. 3 is a schematic representation of a circular distributed array elements.

The subarrays need not to be interconnected in any way which further enhances their survival. To illustrate how 60 subarrays can operate as a single system, yet not be connected, is best described using the system that is herein described. In FIG. 3, there is shown a phased array radar of 60 subarrays which are equally spaced along the circumference of a 200 nmi diameter circle. Each subarray transmits a single pulse at a different frequency in a time sequence such that all 60 pulses arrive at some predetermined azimuth and range in exactly the same time. If a target is at this location, then it reflects 60 subpulses to the subarrays. In each subarray, there are 60 receivers tuned to the frequencies transmitted, and outputs of these receivers are summed and applied to a detector. Thus, each subarray receives, processes, and sums the transmit pulse from every subarray and no interconnection between receiving subarrays is needed. Each subarray performs target detection using the sum signal from 60 subarray transmissions; a single subarray transmission lacks the signal strength for target detection but the sum signal of 60 subarrays is adequate.

The land-based, distributed system uses noncoherent, time-delay processing which permits wide dispersal of radiator elements without the creation of grating lobes. The use of conventional, coherent radar signal processing with this distributed system produces grating lobes that preclude any practical radar operation. This does not mean that noncoherent, time-delay processing is a general replacement for conventional radar processing. Its use in a conventional array results in a processing output signal of significantly lower power than that produced by conventional processing. However, for this application, conventional processing is impractical. In order to scan in azimuth, the timing of the pulses from the subarrays are varied in a predetermined pattern, which can be accomplished by using self-contained, atomic clocks and a programmed computer at each subarray. Each subarray operates unattended and has an emergency diesel generator.

The land based, distributed array radar is a system of 60 subarrays located approximately equidistant along the periphery of a 100 nmi radius circle. The exact spacing is not critical. Each subarray transmits a 2000 μsec expanded pulse at one of 60 frequencies so that a target object returns 60 pulses at different frequencies to each subarray. At each subarray, 60 receivers compress the expanded pulse to 10 μsec and produce four time delayed signals. Four time delayed signals rather than one time delayed signal are used for angle estimation of the targets' angular position. Each of the four time signals from each receiver are noncoherently added to produce four output signals at each subarray. A detection occurs when any one of the four added outputs exceed a preset threshold. Simultaneous processing of all four outputs for any detection gives estimates of range, azimuth, and elevation. A succession of detections gives range rate and azimuth rate. These results can then be used to predict impact points for tactical warning.

In FIG. 3 there is shown a circular configuration of the 60 subarrays which is superimposed on the state North Dakota for scaling purposes. For an actual installation, individual subarrays would not be located in missile fields. All subarrays look to the north and have array normals at 2° TN. Each subarray provides ±40° of azimuth coverage, relative to array normal.

Each subarray is a self-contained, small phased array radar that operates unattended and is designed with some measure of nuclear hardness. Because of 10 nmi space between each subarray, one dedicated nuclear weapon per subarray is required to destroy them, and even if one-half of the subarrays were destroyed, the system can continue to operate with a reduced capability. S-Band operation allows the use of existing components, and a 4 MHz minimum separation is used between the transmit frequencies of any two subarrays. The subarray radar characteristics are given in Table 3-1.

TABLE 3-1

| Subarray Radar Characteristics | |
|---|---|
| Operating Frequency | S-Band |
| Antenna Size | 7 ft. x 18.25 ft. |
| No. of Elements | 2980 |
| Peak Power | 480 KW |
| Average Power | 28.8 KW |
| Pulsewidth | 2000 μsec |
| Compressed Pulsewidth | 10 μsec |
| Pulse Repetition Frequency | 30 pps |
| Minimum Receiver Bandwidth | 240 MHz |

Figure 4:
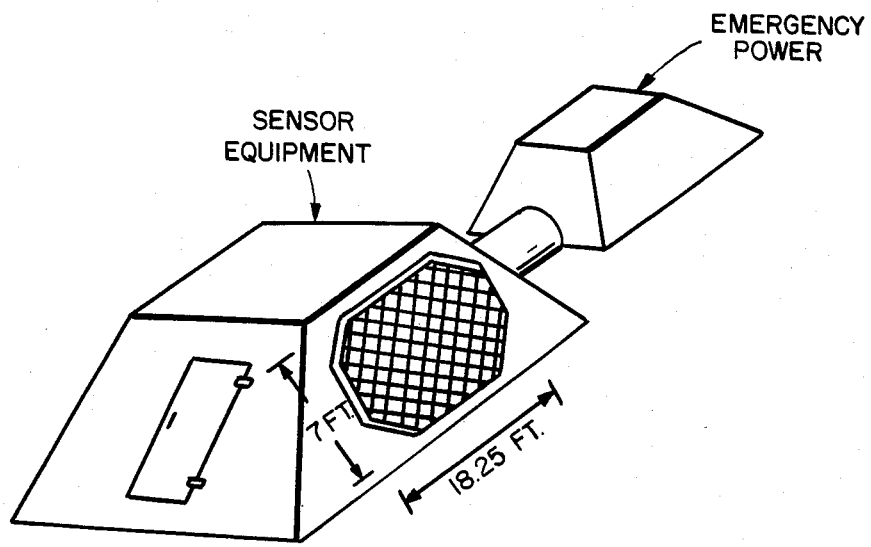
FIG. 4 is an isometric view of a subarray unit, and represents an alternate configuration to the concept in FIG. 2.

In FIG. 4, there is shown a housing configuration for a subarray unit. Two structures are shown, one for the equipment and the other for emergency power. The structure is constructed of welded steel plate anchored to a concrete pad and is designed to 2 psi of overpressure which is the expected blast from a 1 MT weapon 5 nmi away. The 60 subarrays do not require any interconnections between them and transmit the pulse sequences with predetermined delays with the timing derived from an atomic clock. A tech control loop is used in peacetime to monitor the status of each subarray during periodic operation. Most of the time, the system does not radiate because its use is intended for the post-attack period or it can be activated during increasing DEFCON levels.

Figure 5:
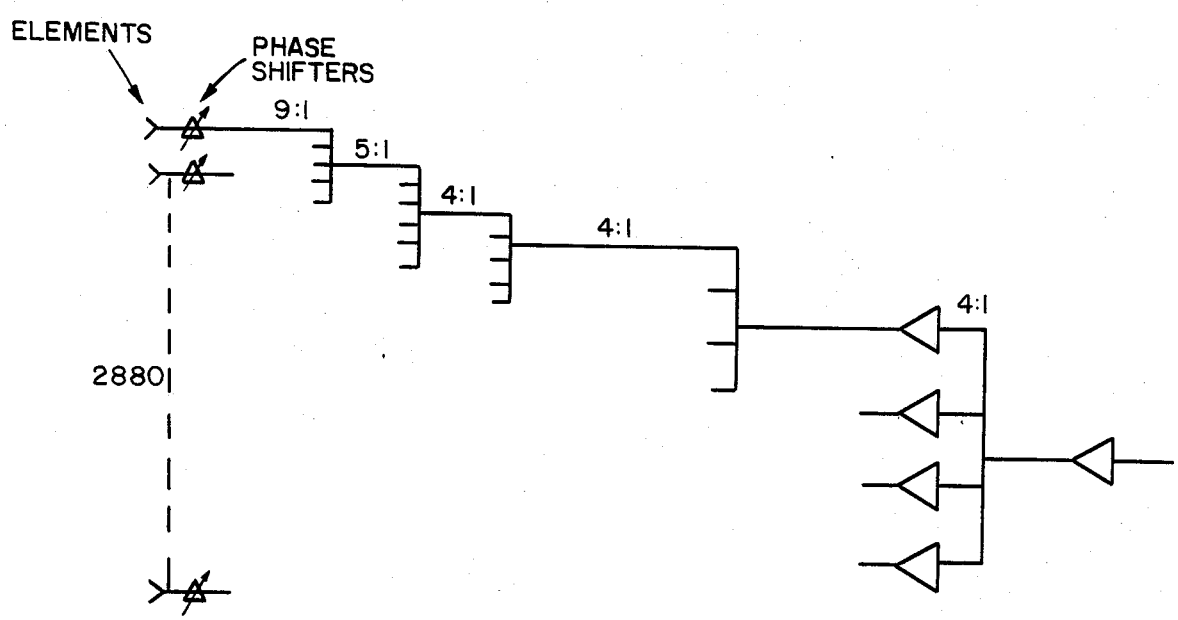
FIG. 5 is a schematic representation of the transmit feed structure.

The array components and transmitter hardware are derived from COBRA JUDY and need no further development but do need some modifications. The radiating elements are similar to those used in the Missile Site Radar, part of the SAFEGUARD system, and are designed for some nuclear hardening. A corporate feed system is used to connect the array elements with the transmitter and receiver as shown in FIG. 5.

Figure 6:
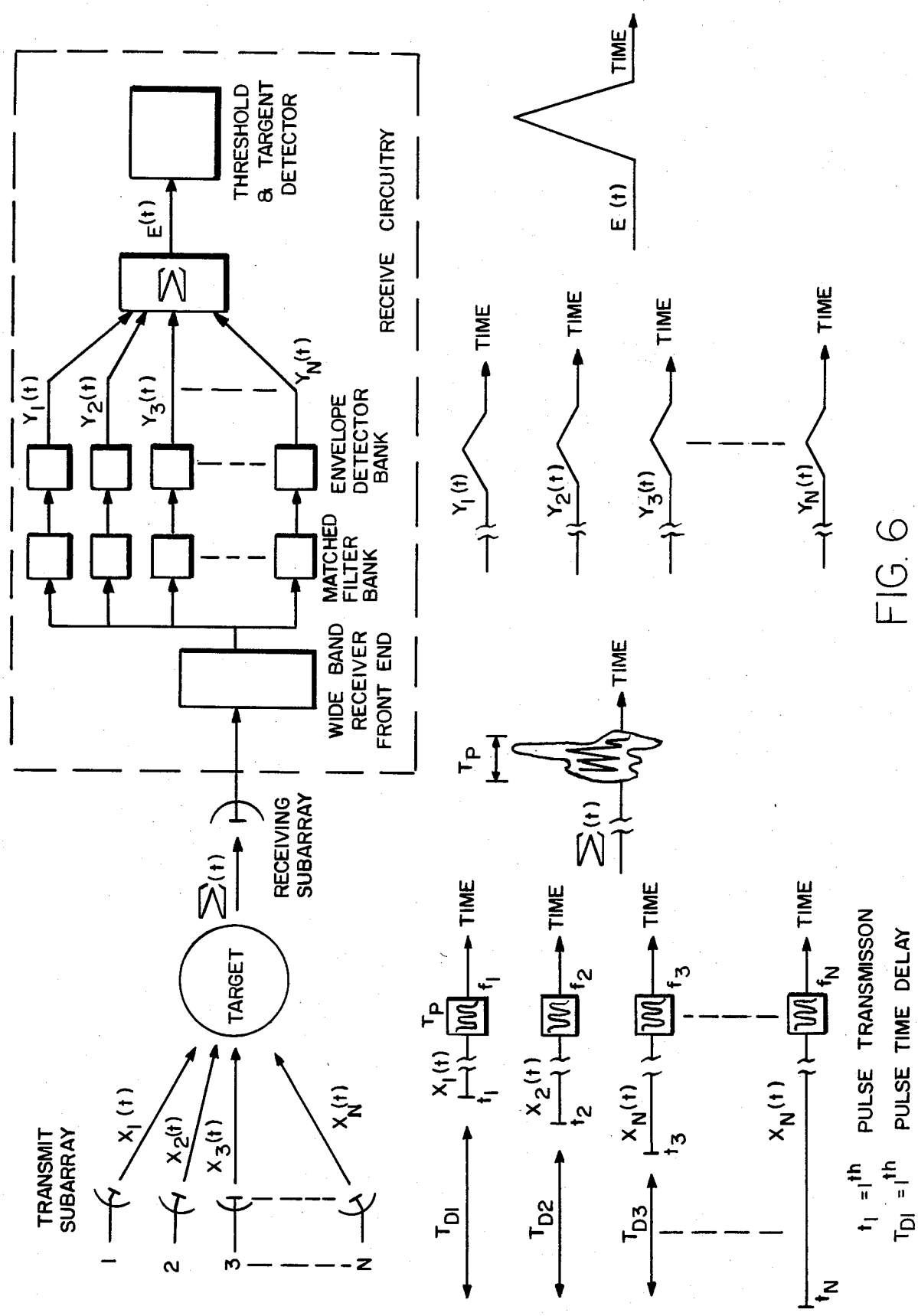
FIG. 6 is a block diagram of the subarray processing condifuration.

In FIG. 6, it is shown that the receiver consists of a wideband frontend followed by 60 parallel channels of IF filters, detectors, and delay lines. Each receiver channel generates four outputs which are used in time delayed steering for multiple, simultaneous lobing. This provides a uniform level of illumination as targets pass through the beam and enhances the probability of multiple detection. In addition, lobe comparison is used to provide target azimuth and elevation estimates.

It is important to note that because the target return of every subarray transmission is processed separately in the receiver, it is possible to individually time delay any subarray transmission. Signal delays necessary for time-delay steering can be implemented by either the transmitter or receiver with equal signal response (delays need not be implemented strictly by the transmitter. Thus, the four outputs of each subarray are four different simultaneous time-delay steering output signals.

The distributed land-based radar performs target detection on signals formed by the simultaneous noncoherent transmissions of multiple subarrays and the noncoherent time integration of multiple receive pulses. The signal to noise ratio (S/N) for each subarray is established based on the probability of detecting tanks at 2000 nmi range and 3° search elevation. The average S/N for a single pulse transmitted and received by a single subarray is found using tdhe equation below.

$$\frac{\bar{S}}{N} = \frac{G^2 P \lambda^2 \bar{\tau \sigma}}{(4\pi)^3 R^4 K T_o (T_s/T_o) L_s L_{\bar{R}} L_T}$$

where;
P = Peak Power (watts)
G = Antenna Gain (numerical value)
λ = Operating wavelength (m)
σ = Average target radar cross section (m²)
τ = Uncompressed pulsewidth (seconds)
K = Boltzman's constant (1.23 × 10⁻²³W/°K./Hz)
$T_o$ = 290° K.
$T_s$ = System noise temperature (°K.)
$L_s$ = System loss (numerical value)
$L_R$ = Receiver non-ohmic loss (numerical value)
$L_T$ = Transmit loss (numerical value)

The solution to this equation is given in tabulated form in Table 3-2. A detailed breakdown of system, receive, and transmit losses are given in Tables 3-3 and 3-4.

The hardware losses are given in Table 3-3 and are compatible with the corporate feed shown in FIG. 5. The transmit and non-ohmic receive losses of Table 3-3 are included directly in the sensitivity formulation in Table 3-2. The ohmic receive losses are reflected in the system noise temperature $T_s$.

The system noise temperature is calculated using the expression, $$T_s = T_a + T_r + L_r T_e \tag{3.1}$$

where;
$T_a$ = Antenna noise temperature
$T_r$ = Receiving-transmission-line noise temperature
$T_3$ = Receiver noise temperature
$L_r$ = Receiving-transmission line loss (receive ohmic loss).

TABLE 3-2

| Tabulated Range Equation (Search); Land Based, Distributed Radar | | | | |
|---|---|---|---|---|
| Item | Symbol | Quantity | + | − |
| Antenna Gain* | $G^2$ | 81.4 dB | 81.4 | |
| Peak Transmitter Power | P | 480K watts | 56.8 | |

TABLE 3-2-continued

Tabulated Range Equation (Search);
Land Based, Distributed Radar

| Item | Symbol | Quantity | + | − |
|---|---|---|---|---|
| Range | $R^4$ | $(2000 \; 1852 \text{ m})^4$ | 262.7 | |
| Wavelength | $\lambda^2$ | $(.1 \text{ m})^2$ | | 20.0 |
| Pulsewidth | $\tau$ | 2 msec | 26.9 | |
| $(4\pi)^3$ | | | | 33.3 |
| $KT_o$ | | | | 204.0 |
| $T_s/T_o$ | | (420/290) | | 1.6 |
| Average Target Cross Section | $\sigma$ | 7 dBsm | 7.0 | |
| System Loss | $L_s$ | | | 5.9 |
| Receive Loss (non-ohmic) | $L_R$ | | | 1.1 |
| Transmit Loss | $L_T$ | | | 2.7 |
| | | | 349.2 | 353.9 |

$\frac{S}{N} = -4.7 \text{ dB}$

*Antenna Gain is based on an elliptical array of dimension of 2.15 × 5.55 m.

TABLE 3-3

Hardware Loss Budget

| | Transmit Loss | Receive Loss (Ohmic) | Receive Loss Non-ohmic |
|---|---|---|---|
| Front Element | 0.1 | 0.1 | — |
| Phase Shifter | 1.2 | 1.2 | — |
| Similarity | 0.4 | — | 0.4 |
| Power Dividers & W.G. | 0.6 | 0.6 | — |
| Directional Coupler | 0.1 | — | — |
| Isolators | 0.3 | — | — |
| Duplexer | — | 0.3 | — |
| Receiver Beam Former | — | 0.4 | — |
| Mismatch | — | — | 0.1 |
| Taper | — | — | 0.6 |
| | 2.7 | 2.6 | 1.1 |

TABLE 3-4

System Loss Budget (dB)

| | System Loss |
|---|---|
| Atmospheric | 1.6 |
| Lens | 0.5 |
| Scanning | 0.7 |
| Range Walk | 0.2 |
| Beam Shape | 2.9 |
| | 5.9 |

Values for $T_a$, $T_r$, and $T_e$ are calculated as, $$T_a = 0.876 T_a' + 36° = 79° \text{ K}. \quad (1)$$

where,
$T_a' = 43°$ K. (3000 MHz, 3° elevation).

$$T_r = T_{tr}(L_r - 1) = 237° \quad (2)$$

$$T_e = T_o(F_N - 1) = 56° \quad (3)$$

where,
$F_N$ = Receiver noise factor = 0.77 dB.

Therefore, from equation 3.1, the system noise temperature is, $$T_s = 79° \text{ K.} + 237° \text{ K.} + 56°(1.82) = 420° \text{ K.}$$

The atmospheric and lens losses are given in Table 3-4. The scan loss corresponds to ±40° azimuth limits of scan for the distributed array. The range walk loss corresponds to a target with 0.12 nmi/sec of range rate uncertainty using a 10 μsec pulse. The beam shape loss is calculated based on the probability of rank detection in target search.

Range walk loss occus for multiple pulse integration when targets have range rates that cause time misalignment of receiver matched filters to target return pulses. Most targets follow minimum energy trajectories and those in the distributed array coverage area having closing range rates that vary between 2.3 nmi/sec and 2.55 nmi/sec. By using the mean range rate of 2.42 nmi/sec in performing multiple integration, a range rate uncertainty of 0.12 nmi/sec exists during this integration period. This results in a signal to noise ratio reduction per received pulse of 0.2 dB when using a 10 μsec compressed pulse.

The distributed, land-based system operates by continual scanning of the ±40° azimuth coverage region. One hundred beam dwells are required per scan using beam-to-beam separation of 0.8° azimuth and centering each beam at 3° elevation. During a dwell, the beam position is maintained for 9 consecutive pulse repetition intervals (PRIs) so that target detections are made using noncoherent integrated signals from 9 returns. Therefore, each scan of 100 dwells requires 900 transmission intervals at a 30 Hz pulse repetition frequency (PRF), resulting in a 30 second time duration for each scan. In addition, beam dithering is used where the entire beam ensemble of a scan is shifted in azimuth by 0.4° on a scan-to-scan basis.

The two-way beams produced by the distributed radar at each beam position within a scan results from the combination of directive subarrays, 60 transmit and ove receive, with four time delay steering outputs produced for each return. At each transmission, 60 transmit subarrays and one receive subarray are directed at a single, designated beam position; the designated beam position is any one out of the 100 used during a scan. This illuminates a region in space having maximum illumination at the center of the beam position and −6 dB two-way beamwidths of 1.05° in azimuth and 2.72° in elevation.

Figure 7:
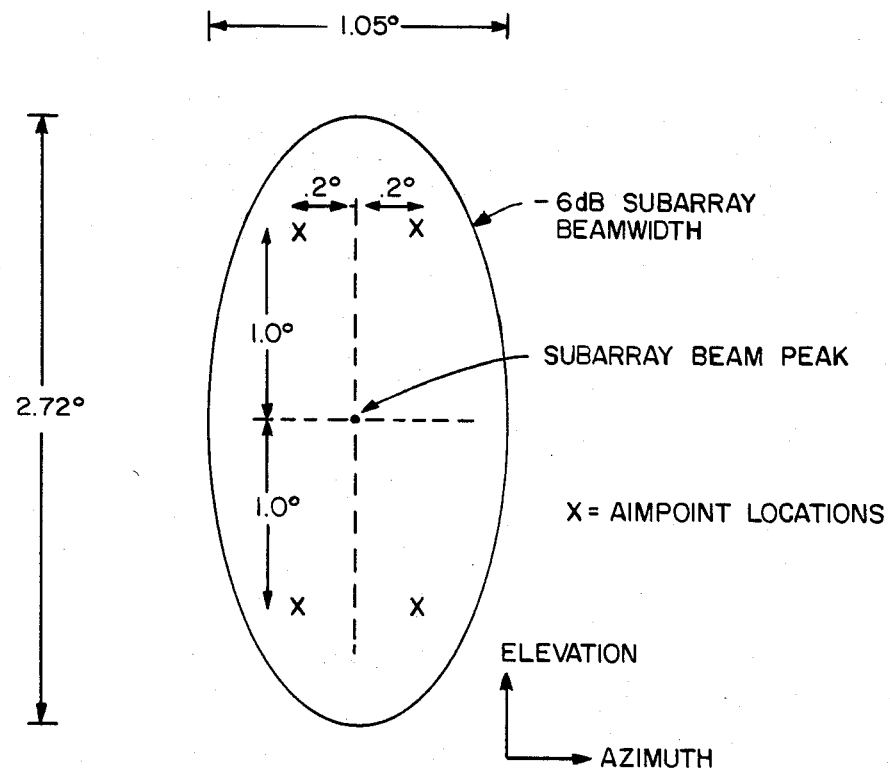
FIG. 7 is a schematic representation of the subarray beam and aimpoints configuration.
Figure 8B:
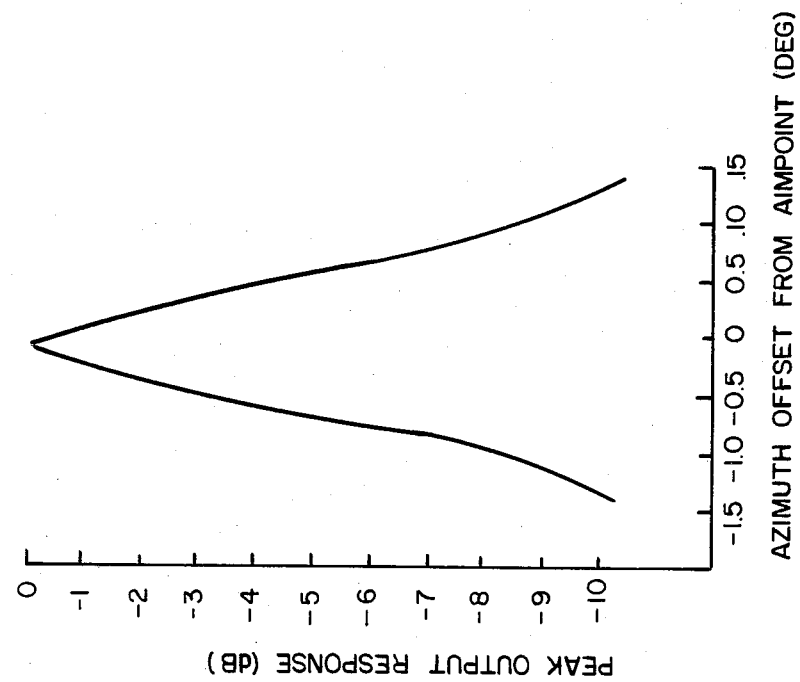
FIG. 8b is a graphical representation of the peak response versus elevation offset.
Figure 8A:
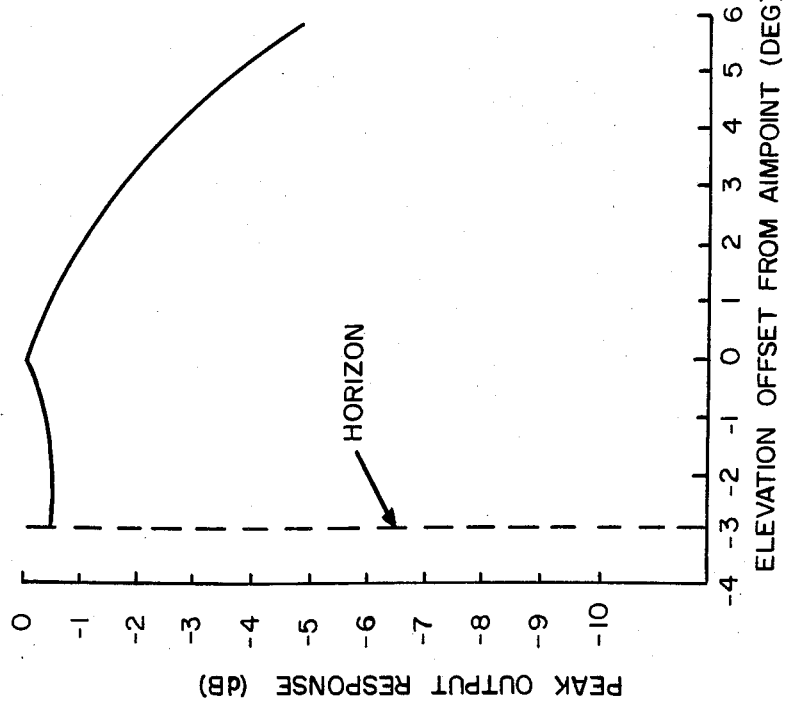
FIG. 8a is a graphical representation of the peak response versus the azimuth offset.
Figure 8C:
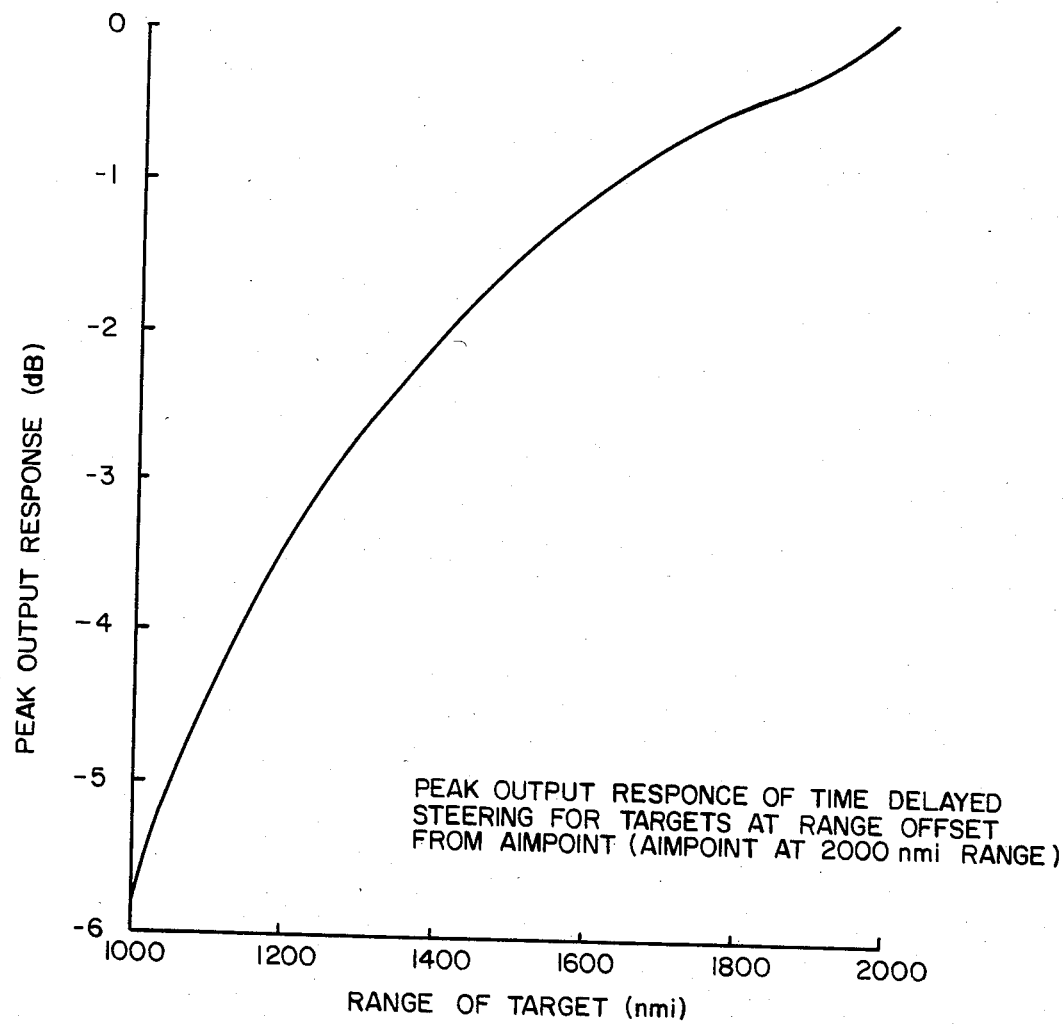
FIG. 8c is a graphical representation of the peak response versus range offset.

On receive, four different time delayed steering outputs are formed for each return, shown as outputs A, B, C, and D in FIGS. 3–4. The aimpoints used for each transmission result from the preselected time delays used in the receiver channels of the receiving subarray ($\tau_{1A}$, $\tau_{1B}$, $\tau_{1C}$, and $\tau_{1D}$ through $\tau_{60A}$, $\tau_{60B}$, $\tau_{60C}$, $\tau_{60D}$ in FIGS. 3–4). For this distributed system, the aimpoint locations are at 2000 nmi range and offset from the center of the beam position by ±0.2° in azimuth and ±1.0° in elevation; FIG. 7 shows the configuration, in angle, of the illumination provided by the subarrays (i.e., the subarray beam) and four aimpoints. By taking the product of the subarray illumination pattern and time-delay steering responses, target signal responses are estimated; this is done in conventional arrays to establish the combined response of element patterns and array factor. FIGS. 8a, 8b, and 8c show peak responses of a single time delay steered output for a target at range and angle offsets from aimpoint for a circular array of 60 isotropic radiators equally spaced around a 200 nmi diameter circle. The aimpoints are at 2,000 nmi range, 3° elevation, and 0° azimuth, and a 10 μsec compressed pulse is used. Thus, the composite −6 dB two-way beam of subarray illumination and time-delay steering has a beamwidth of 0.9° in azimuth and 2.4° in elevation.

The four angularly offset time delay steering outputs are used to create a uniform illumination level within each beam. In addition, the four outputs are used in simultaneous lobing which provide target angle information through comparisons of output levels.

The effects of range offset losses (FIG. 8c) must be considered with radar gains. Table 3-5 shows the net change in signal strength for targets offset in range from aimpoint. It is seen that radar gains exceed offset target signal losses. Thus, a conservative approach is used where no signal change is assumed for range offset targets.

TABLE 3-5

| *Range of Target | Overall Signal Response for Range Offset Targets | | |
|---|---|---|---|
| | Peak Response (dB) | Radar Signal Gain (dB) | Net Gain (dB) |
| 2000 | 0.0 | 0.0 | 0.0 |
| 1900 | −0.36 | +0.89 | +0.53 |
| 1800 | −0.49 | +1.83 | +1.34 |
| 1700 | −0.82 | +2.82 | +2.00 |
| 1600 | −1.14 | +3.88 | +2.74 |
| 1500 | −1.57 | +5.00 | +3.43 |
| 1400 | −2.06 | +6.20 | +4.14 |
| 1200 | −3.44 | +8.87 | +5.43 |
| 1000 | −5.87 | +12.04 | +6.17 |

*Range of aimpoint = 2000 nmi

Finally, the probability of target detection in search is determined for a tank at 2000 nmi range. The minimum energy target trajectories viewed by the distributed array show elevation rates of 0.04 deg/sec. These targets pass through the radar scan region in elevation in 60 seconds (2.4/0.04=60 secs). Since the time duration of a single scan is 30 seconds, two detection opportunities (two dwells) occur for each target.

The detection probability for a single dwell is estimated based upon the statistical behavior of the fluctuating target objects (i.e., tanks). By modelling the fluctuating target objects as a collection of uniformly distributed reflectors along a line of a 9.4 meter length, the degree of correlation between two pulses of different transmit frequency that are simultaneously reflected from the target can be estimated as:

$$p(\Delta f) = \frac{\sin^2[2\pi L \Delta f/c]}{[2\pi L \Delta f/c]^2} \quad (3.2)$$

where,
p(Δf)=correlation function
Δf=frequency offset between signals
c=velocity of light ($3 \times 10^8$ m/sec)
L=target length (9.4 m).

Figure 9:
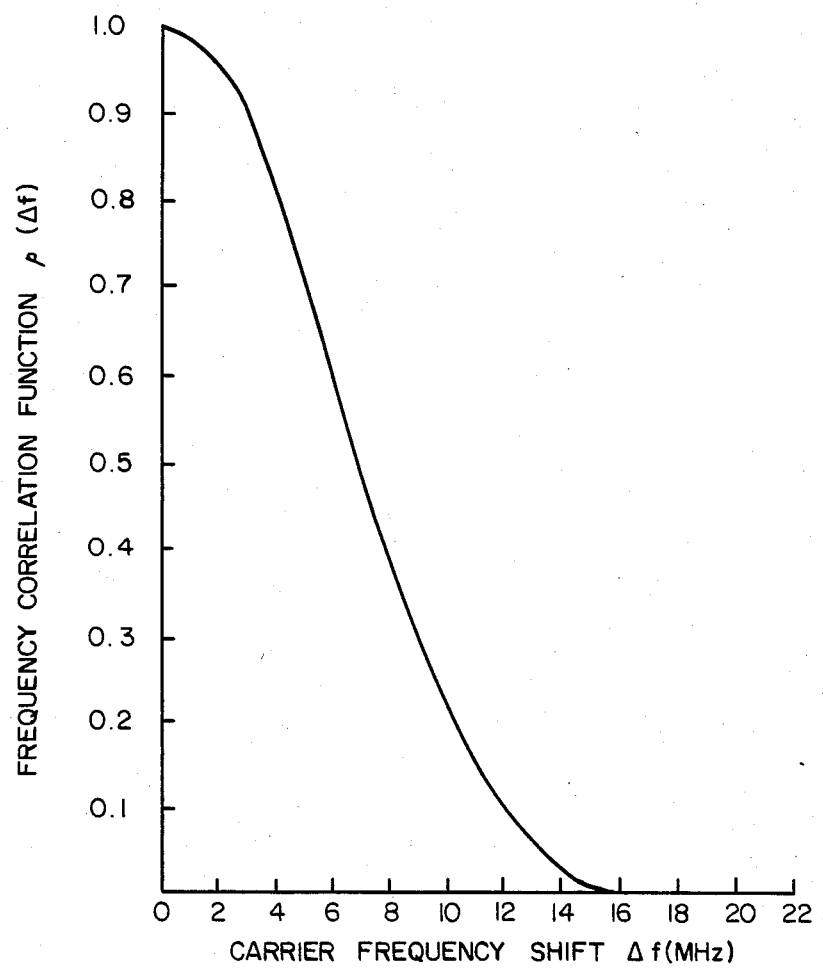
FIG. 9 is a graphical representation of the frequency correlation function versus frequency offset.

The correlation function, p(Δf), is plotted in FIG. 9.

A correlation function level of 0.5 is considered adequate to assume statistical independence between two frequency offset pulses. Since the land-based distributed array uses a 4 MHz minimum frequency separation between the simultaneous transmissions of adjacent subarrays, it is seen from FIG. 9, where p(Δf)=0.5 occurs for a frequency separation of 8 MHz, that the target reflection from every other subarray transmission is statistically independent. This means that the receiver output pulse for each array transmission can be modelled as the sum of 30 reflected pulse pairs (60 reflected pulses) where the target return is constant within each pair but is random from pair to pair. Extending this to the output of a single dwell where a nine pulse integration is used, it is seen the output pulse consists of 270 pulse pairs, where the target return is constant within each pair but random from pair to pair.

As opposed to the statistical behavior of the target which is constant within a pulse pair, the noise behavior is assumed random from pulse to pulse. Thus, the statistical behavior of a single dwell output pulse is modelled as the sum of 270 pairs that have a random target level from pair to pair, but constant within a pair, and a noise level that is random from pulse to pulse.

To estimate the detection probability for a single dwell output, the central limit theorem is used to establish the statistics for a single dwell output using 270 pulse pairs of noise only (no target signal). From this, a threshold level is established that gives a detection probability of noise only (PFA) of $1.0 \times 10^{-6}$ for a single dwell. The central limit theorem is also used to establish the statistics for a single dwell output of 270 pulse pairs of a target return signal plus noise. By applying the threshold established using a dwell of pure noise to the statistics of a dwell using target signal plus noise, the probability of target detection is established for a single dwell; these detection probabilities are plotted as a function of S/N ratio in FIG. 10.

Figure 10:
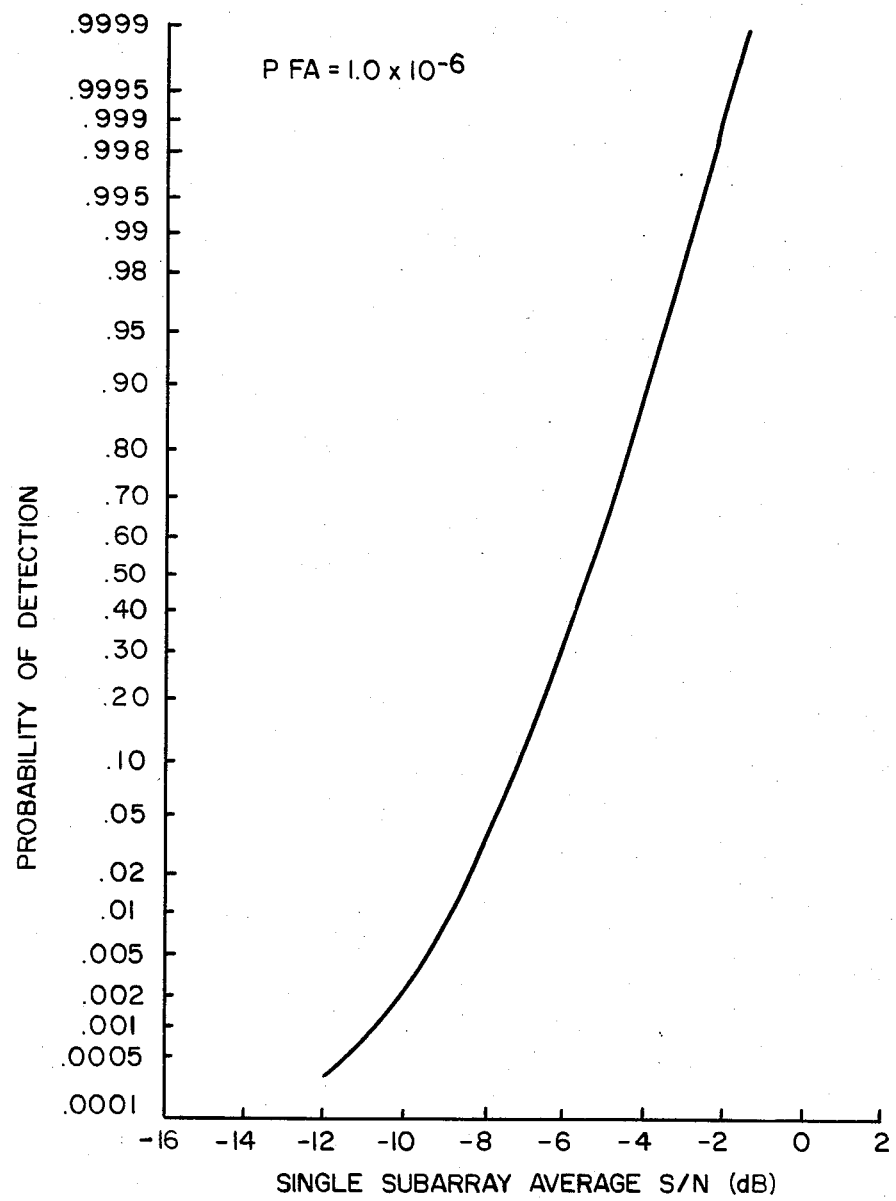
FIG. 10 is a graphical representation of the probability of detection in a single beam dwell.

Turning to FIG. 10, the probability of target detection in a single dwell for an average S/N of −4.7 dB (Table 3-2) is found to be 0.7. Thus, the cumulative detection probability of a target in a pass (i.e., dwells is $1-[1-0.7]=0.91$. In stating this result, it must be cautioned that the probability of generating two detections per tank cannot be inferred using FIG. 10 and Table 3-2. This is because the probability of detection in each of two beam dwells are highly dependent events. Thus, the probability of two detections per target must be developed independently.

The theory of operation for the distributed, land-based radar which illustrates the general processing technique and performance characteristics of the distributed radar will now be given. A simple, linear array configuration that considers the effects of varying the target location in two dimensions (range and azimuth angle) will be utilized as the example to describe the noncoherent signal processing used in this system, and this method of processing is compared to coherent signal processing. The performance characteristics for a distributed circular array configuration will herein be briefly presented.

The following mathematical analysis is presented to illustrate the operation of a linear array system. The performance of the simple, linear array model is analyzed mathematically to provide an understanding of the basic characteristics of a distributed array using time delay steering. The linear array model is also simulated using program DPAR to confirm the validity of both the simulation and mathematical methods. The performance of the circular, distributed array may be analyzed in a similar manner.

The usage of common radar terminology is avoided when describing the characteristics of the distributed radar. For example, the terms "aimpoint" and "spatial signal enhancement" are used as opposed to the more familiar terms of "pointing angle" and "beam forming". This is done to prevent confusion since the more common expressions have specific connotations associated with conventional radars which may not apply to the distributed radar.

The basic principles of operation for the distributed radar are illustrated using a simple, linear array model. All variations in target locations are restricted to a two dimensional plane or at a 0° elevation angle in three dimensions. The noncoherent processing technique by which the radar detects targets (i.e., time delay processing) is first discussed. This is followed by discussions on the effects of variation in target location.

As previously mentioned, mathematical analysis and computer simulation, using program DPAR, is performed on the simple linear array. This establishes the basic characteristics of the distributed array using a configuration which can be analyzed. The subsequent examination of the circular array is developed using the results of this section.

The noncoherent processing technique which is used for the distributed array radar is herein described. The development of this technique is required due to the inadequacy of conventional, coherent processing techniques for use with the distributed array. An expression is developed showing the relationship of the time delays used by the system to target location can be searched.

In conventional array radars, electronic beam steering is used to maximize the array gain in the direction of targets and provide maximum signal enhancement. In these radars electronic beam steering results from the formation of phase fronts. Phase fronts are created in conventional arrays for coherent techniques of time, phase, or frequency which adjust the signal through each radiating element to generate equi-phase planes in space (the phase fronts). By creating phase fronts that are normal to the direction of the target, the array gain is maximized at the target.

To use the technique described above, it is necessary that conventional arrays have element separation distances of less than a wavelength; $0.6\lambda$ is used in most phased array detection radars. Increasing the separation distance creates grating lobes in space so that target location in angle becomes ambiguous. Therefore, the use of coherent techniques with widely separated elements is not practical because of these grating lobes. However, it is possible to use a technique of noncoherent processing and time delay steering to achieve the desired result of wide dispersion without grating lobes.

Unlike a conventional radar, the distributed radar comprises a large number of widely separated subarrays whose outpus are processed as a single, large array. Between 50 and 100 subarrays can be used with separation distances of 10 nmi or more between each subarray. Each individual subarray is a small, phased array radar, but each is treated as a single, radiating element with limited power and scanning capabilities. As mentioned above, the large separation distances between radiating elements prevents this radar from utilizing the coherent techniques for target signal enhancement used by conventional arrays. In fact, it is unclear whether meaningful phase front can even be considered at separation distances used here due to the precision requirements in determining the location of each subarray and in controlling the phase of transmission from each. Thus, the distributed radar uses a novel technique of noncoherent processing with a series of specified time delays to adjust transmit times and provide signal enhancement and does not require either exact position or phase control. The technique is illustrated using the simple linear array shown in FIG. 1.

In FIG. 1, the linear array of N isotropic radiators with a subarray separation distance D must illuminate location A at range $r_o$ using a rectangular pulse; the range $r_o$ is the distance from subarray #1 to location A. Subarray #1 is the array reference point (i.e., location 0, 0, 0) for the linear array. Time delay processing can be used with any transmit waveform, including chirped CW. However, a simple CW pulse transmission is assumed here for ease of illustration. Equal pulsewidth transmissions are radiated from each subarray with the transmit time of each subarray adjusted by a predetermined time delay to produce a simultaneous time of arrival for all for all pulses at location A. The time delay required at each subarray can be expressed as, $$T_{Di} = \frac{(N - i)D}{D} \quad (B.1)$$

where,
$T_{Di}$ = Transmit time delay required at the ith subarray
C = Speed of light
i = Individual array number
N = Total number of subarrays.

The simultaneous arrival of pulses creates a single pulse at A which is the sum of N pulses and whose amplitude is larger than that of a single pulse and thus has a higher S/N that that of a single pulse. The sum-pulse amplitude is dependent upon the number of subarrays, N, and the type of processing used.

A target at location A will reflect all pulses in time coincidence back to the array, where it is received and processed by a selected receiving antenna. In theory, it is possible to use a central processor to process the received signals combined from multiple receiving antennas or subarrays. However, to increase the radar nuclear survivability, the distributed array will use a single, stand alone receiver, either at a single subarray or at a remote, special purpose, receiving antenna. Using a single, receive antenna eliminates the need to interconnect the subarrays. Thus, system survivability is increased due to the absence of interconnecting data links between subarrays that can be damaged by a nuclear weapon. For ease of illustration, subarray #1 of FIG. 1 is assumed to be the designated receiving subarray.

By virtue of a simultaneous pulse arrival, the sum pulse at location A has a pulsewidth equal to that of an individual pulse. The sum pulse amplitude on receive, however is dependent upon the processing used. The noncoherent processing used for this application is shown in simplified form in FIG. 6.

In noncoherent processing, each subarray transmits a CW pulse of pulsewidth $\tau_p$ and amplitude $A_s$ using appropriate time delays. Each pulse amplitudes are assumed for ease of illustration. In addition, each subarray transmits at a different frequency, $f_i$, as shown in FIG. 6; $f_i$ represents the transmit frequency of the ith subarray. This produces a single, sum pulse at location A, which is reflected back to the receiving subarray by a target.

A wideband receiver is used so that the frontend output is parallel fed to N channels, where each contains a matched filter and envelope detector. The filter in each channel is matched to a rectangular RF pulse from a specific subarray so that each filter center frequency is the down-converted transmit frequency of a particular transmit pulse. In this way, each channel responds to a separate subarray transmit pulse, producing envelope detected signals for all of the N transmit pulses: $y_1(t), y_2(t), y_3(t), \ldots y_N(t)$ of FIG. 6. These signals are summed to generate the sum signal E(t).

The sum signal E(t) is the single output signal of noncoherent processing. It is the signal which is thresholded and range gated for target detection. It is also used to examine the output response of the system to various inputs. Throughout this report, E(t) is referred to as the output signal of the system.

It is estimated that an increase in S/N (i.e., signal enhancement) of [10 $\gamma$ log N] is obtained from the noncoherent summation of N pulses of a nonfluctuating signal relative to that of a single pulse. The parameter $\gamma$ estimates the integrator efficiency based on N and probability of false alarm and is approximately 0.75 for the distributed array radar. Therefore, a 7.5 log N signal-to-noise increase is achieved using the noncoherent integration of N subarray transmissions, as compared to that of a single subarray transmission.

Using time delay processing, signal enhancement can be obtained in any direction. This is analogous to beam pointing in conventional array radars. The transmit time delays for each subarray are adjusted to produce simultaneous arrival of pulses at any desired location in range and azimuth. The technique is again illustrated in FIG. 1.

For the two-dimensional case of FIG. 1, it is desired to search location B at range $r_o$ and azimuth angle using a rectangular pulse as before. In this case, the range from the ith subarray to location B, $r_{Bi}$, is expressed as, $$r_{Bi} = [r_o^2 + (Di)^2 + 2r_o Di \cos\theta]^{\frac{1}{2}} \quad (B.2)$$

where,

D = Subarray separation distance $r_o$ = Range of the target relative to array reference point (subarray #1).

By using subarray transmit time delays that are calculated from equation B.2, the transmit pulses arrive simultaneously at location B, producing signal enhancement at location B. The necessary time delay at the ith subarray can be expressed as, $$T_{Di} = \frac{r_{BN} - r_{Bi}}{c} = \quad (B.3)$$

$$\frac{1}{c}\{[r_o^2 + (DN)^2 + 2r_o DN \cos\theta]^{\frac{1}{2}} -$$

$$[r_o^2 + (Di)^2 + 2r_o DN \cos\theta]^{\frac{1}{2}}\}.$$

For the long range case of R >> DN, $T_{Di}$ can be approximated as, $$T_{Di} \approx \frac{D}{C}(N - i)\cos\theta. \quad (B.4)$$

Therefore, the delay in time required at the ith subarray used in time delayed steering is dependent upon the position of the ith radar subarray, relative to the total array, and the location to be searched. For the case of a linear array and a long range target, the time delay for the ith subarray is linearly dependent on the subarray position and the cosine of the azimuth angle $\theta$. From equation B.3, it is seen that real values of $T_{Di}$ exist for all real values of $r_o$ and $\theta$, and all positive integer values of i and N. Therefore, time delays can be found which will illuminate any desired target range and angle.

In summary then, the need for nonconventional time delay steering and noncoherent processing techniques are established. Also, these techniques are shown to be capable of illuminating any desired target position, a result which is valid for both the circular and linear array. What remains to be considered are the effects of a target that is offset from the range $r_o$ and/or angle used in calculating the time delays. This issue is next presented.

The time delay processing provides signal enhancement for targets located at the range and angle for which the subarray time delays have been calculated. At these locations, pulses arrive simultaneously, are reflected, and provide enhancement of any target there. These locations are called aimpoints.

In this section, signal addition is considered for targets offset in angle from aimpoints. In a conventional phased array radar, the effects of signal addition considered here correspond to the signal levels within the mainlobe of an antenna. As previously mentioned, target variations are restricted angles within the plane of 0° elevation. The signal characteristics of interest are pulsewidth and peak amplitude of the output signal E(t) of FIG. 6.

It is shown that the principle effects of targets offset in angle are the pulse broadening of the output and reduction of the peak amplitude. The pulse shape of the output signal produced by angularly offset targets reflects the shape of the array in the same way the beam pattern of a conventional radar reflects the aperture illumination pattern. In addition, it is shown that as the aimpoint approaches 90° azimuth, the system becomes more sensitive towards targets offset in angle from the aimpoint.

Figure 11:
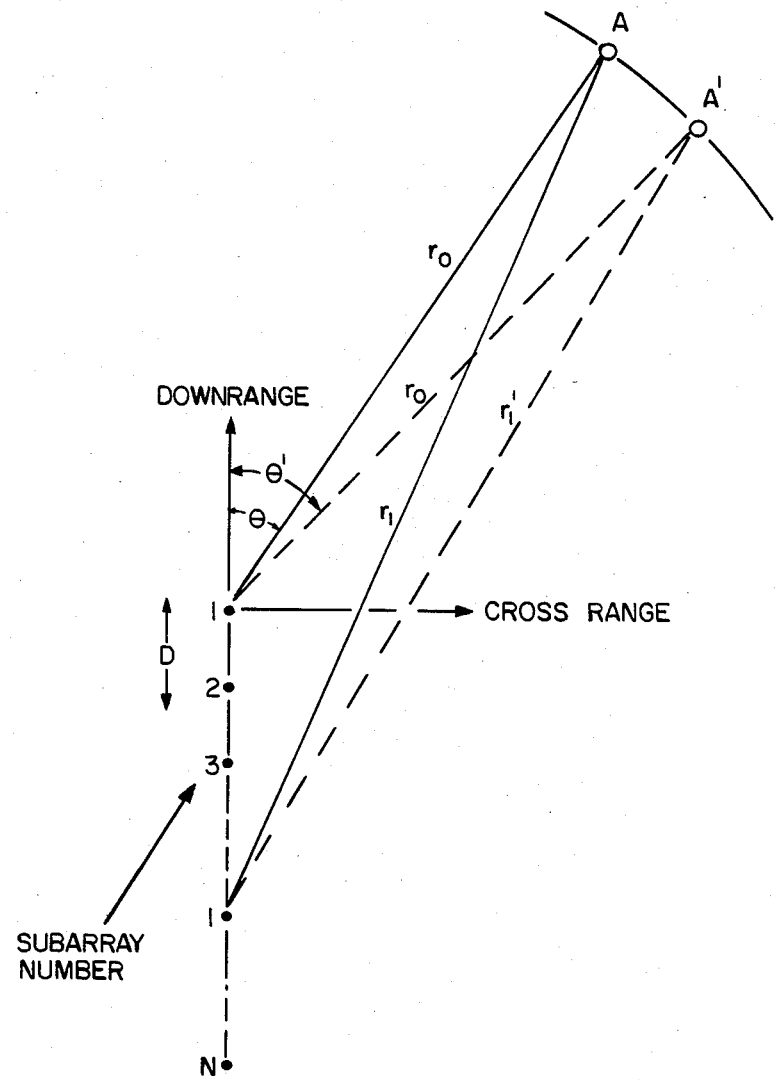
FIG. 11 is a schematic representation of a linear array with angularly offset targets.

The effects of angularly offset targets are illustrated using FIG. 11. In the FIG. 11, a linear array of N subarrays, with separation distance D, illuminates aimpoint A, at range $r_o$ and angle $\theta$, using CW pulses of width $\tau_p$. The target object is located at A', at a range $r_o$ and angle $\theta'$ (i.e., the target is offset in angle from aimpoint A). In this situation, the range to the aimpoint from the ith subarray can be expressed as, $$r_i = [r_o^2 + (Di)^2 + 2r_o Di \cos\theta]^{\frac{1}{2}} \quad (B.5a)$$

where, i = Subarray number.

The range $r_i$ establishes time delays used in delay processing for the ith subarray. The range to the target from the ith subarray can be expressed as, $$r_i = [r_o^2 + (Di)^2 + 2r_o Di \cos\theta']^{\frac{1}{2}} \quad (B.5b)$$

The discrepancy between the target range and the aimpoint range for subarray i is, $$\Delta r_i = r_i - r_i' = \quad (B.6)$$

$$[r_o^2 + (Di)^2 + 2r_o Di \cos\theta]^{\frac{1}{2}} - [r_o^2 + (Di)^2 + 2r_o Di \cos\theta']^{\frac{1}{2}}$$

For the long range condition of $r_o >> DN$.

$$\Delta r_i \approx D_i[\cos\theta - \cos\theta'] = -2Di \sin\left[\frac{\theta + \theta'}{2}\right] \sin\left[\frac{\theta - \theta'}{2}\right] \quad (B.7)$$

$\Delta r_i$ is the difference between the distance the ith transmit pulse travels to the target and the distance it travels going to the aimpoint. This means that the ith pulse arrives at the target offset in time by $\Delta t_i$ from the predicted arrival time using the aimpoint. The time offset, $\Delta t_i$, is given by, $$\Delta t_i = \frac{\Delta r_i}{c}$$

where c is the speed of light and $\Delta r_i$ is given by either equation B.6 or B.7.

Figure 12A:
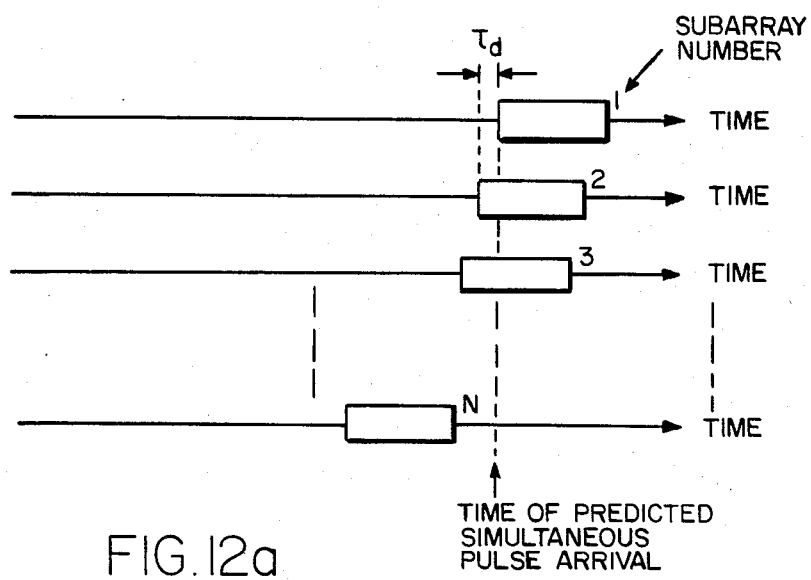
FIG. 12a is a schematic representation of the arrival of N pulses at the target.

This results in nonsimultaneous, time offset pulses arriving at the target as shown in FIG. 12a. (For ease of illustration, it is assumed that $r_o >> DN$ and $\theta' > \theta$). For the linear array under long range conditions, the time offset between adjacent pulses, $\tau_d$, is constant and can be expressed as, $$\tau d \approx \frac{D}{c} (\cos\theta - \cos\theta') = -2D \sin\left[\frac{\theta + \theta'}{2}\right] \sin\left[\frac{\theta - \theta'}{2}\right] \quad (B.8)$$

Figure 12B:
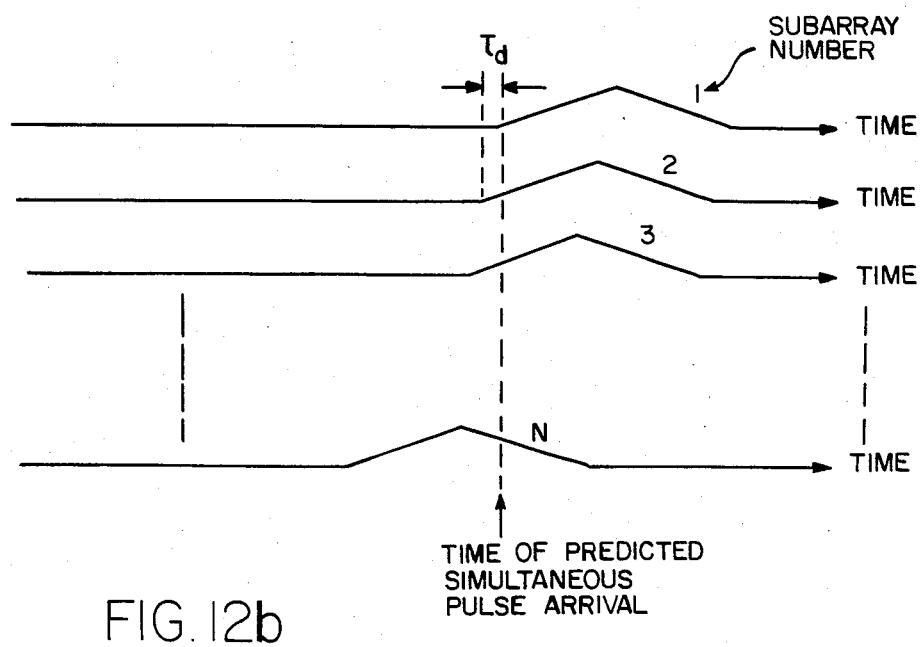
FIG. 12b is a graphical representation of the envelope detected signals for N channel.

Thus, noncoherent processing produces the N channel output signals shown in FIG. 12b. In the figure, the offset between adjacent pulses is again $\tau_d$. Lastly, the resulting summed envelope pulse or output signal, E(t) in FIG. 6, is wider and of lower peak value than that produced by pulses of simultaneous arrival on target.

The peak value reduction and width increase of the sum siganl pulse shape produced by targets angularly offset from the aimpoint is illustrated through the sum of program DPAR. It should be recalled that we are considering the pulse shape variations as the target moves within the antenna mainlobe (again using the conventional array terminology). In DPAR, a linear array of 60 subarrays, with 10 nmi separation distances, is used to illuminate an aimpoint of 10,000 nmi range and 0° azimuth ($\theta = 0°$) using a 1 µsec CW pulse. A 10,000 nmi aimpoint range insures that long range conditions apply, ($r_o >> DN$) while 0° aimpoint azimuth and 1 µsec transmit pulsewidth are arbitrary values chosen for analytic convenience. FIG. B-5 shows the DPAR outputs for targets at 0°, 1.5°, and 2.0° azimuth and 10,000 nmi range; the zero time reference occus at the peak of the pulses.

Figure 13:
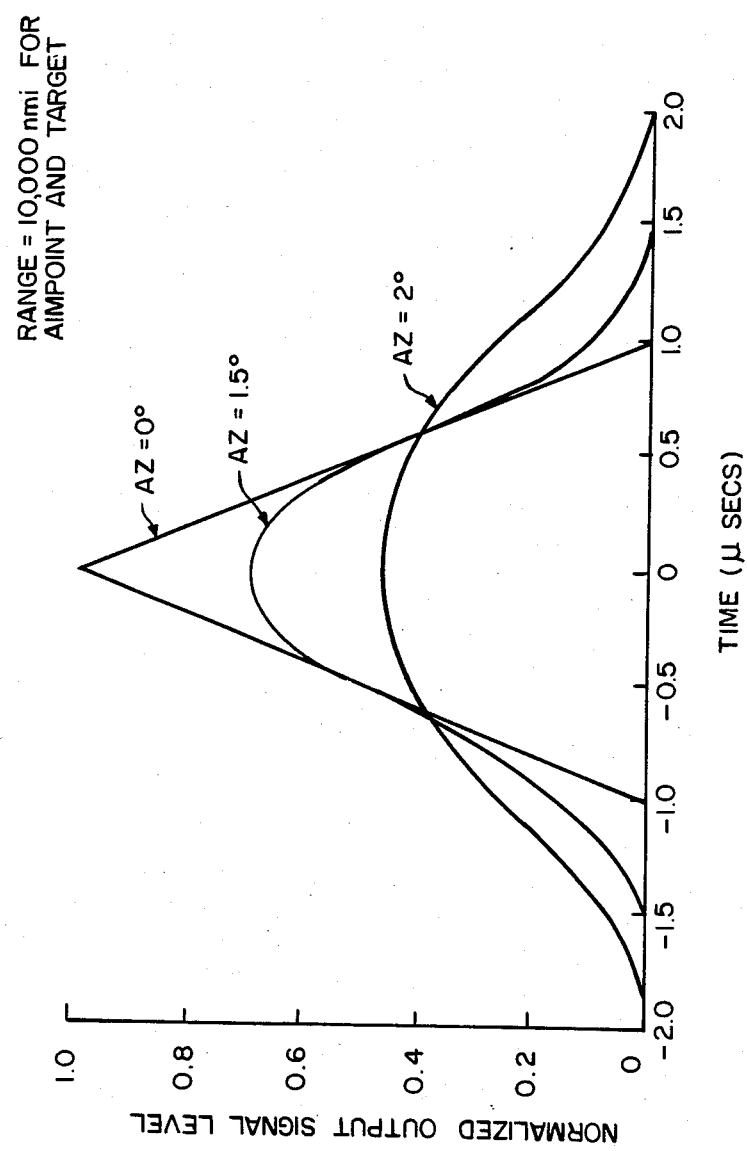
FIG. 13 is a graphical representation of the pulse shape for angularly offset targets.

In FIG. 13, the output pulse broadening and reduction in the peak caused by a target angularly offset from the aimpoint are seen. The signal level of FIG. 13 is normalized to produce a unity peak response for a target at aimpoint. The greater the offset, the greater the peak reduction and pulsewidth increase. The sum pulse shapes which result from targets offset in angle from the aimpoint can be calculated from the summation of a series of time-offset, triangular waveforms, as shown in FIG. 12b.

The pulse shapes in FIG. 13 result from the constant time offsets between return pulses produced by the linear array configuration. When other array configurations are used, different time offsets are produced by angularly offset targets resulting in other pulse shapes. This phenomena becomes evident when using the circular array configuration in a succeeding discussion.

The effects of aimpoint azimuth on the system response to angularly offset targets can be seen from the term, $$\sin\left[\frac{\theta + \theta'}{2}\right] \sin\left[\frac{\theta - \theta'}{2}\right]$$

in equation B.8. For a target at a fixed offset angle ($\theta - \theta'$), $\tau_d$ increases as $\theta$ approach $\pm 90°$, which increases the time offset between pulses in FIGS. B-4a and B-4b. Thus, as the aiming angle, $\theta$, approaches $\pm 90°$, the pulsewidth broadening and the reduction in peak value for an angularly offset target are magnified. This phenomena is illustrated in Table B-1.

TABLE B-1

| Aimpoint Angle $\theta$ | Offset Angle $\theta - \theta'$ | Signal Response for Targets of Fixed Angle Offset | | Approximation Uncertainty $U_Q$ |
|---|---|---|---|---|
| | | Simulated Peak Responses | Approximated Peak Responses | |
| 0° | 1.5° | −3.1 dB | −3.3 dB | 0.2 dB |
| 1° | 1.5° | −8.8 dB | −9.4 dB | 0.4 dB |
| 2° | 1.5° | −12.6 dB | −13.4 dB | 0.7 dB |
| 3° | 1.5° | −15.2 dB | −16.1 dB | 0.9 dB |
| 4° | 1.5° | −17.3 dB | −18.1 dB | 1.1 dB |
| 5° | 1.5° | −18.9 dB | −19.8 dB | 1.3 dB |

In Table B-1, both DPAR and a continuous array approximation are used to produce peak system responses. DPAR is run for a linear array of 60 radiators, each radiator separated by 10 nmi and transmitting a 1 µsec CW pulse at aimpoints of 10,000 nmi range and various azimuth angles; DPAR results are presented as simulated responses. The continuous array approximation uses the long range, $r_o >> DN$, condition so that equation B.8 applies. In addition, a 60 radiator linear array is also assumed with 10 nmi radiation separation distances and a 1 µsec CW transmit pulse.

The results of Table B-1 show dramatically the dependence of signal response on aimpoint angle as 19 dB of peak signal reduction results from $\theta$ increased from 0° to only 5°. In addition, a close correspondence is seen between the simulated and approximated results. The principle reason for discrepancies between the two analytical techniques is that quatization effects from the summation of discrete pulses are neglected in the continuous array approximation. These effects become more significant as approaches $\pm 90°$, and $\tau_d$ reaches a maximum value. Thus, an uncertainty factor, $U_Q$, has been included with the approximated responses to account for deviations between the approximated and simulated responses.

In summary, it is seen that targets angularly offset from aimpoint produce sum signal returns of reduced peak amplitude and wider pulsewidth than that produced by targets at aimpoint. This occurs for both the linear and circular array. It is also see that as aimpoints approach $\pm 90°$, the effects of angularly offset targets are magnified. This result is array configuration dependent and is a principle reason for the selection of the circular array over the linear array. Finally, a close correspondence is established between the simulation results of DPAR and those of continuous approximation confirming the results produced.

In much the same way as targets angularly offset from aimpoint produce variations in output pulse shape, targets which are offset in range from aimpoint produce returns of increased pulswidth and decreased peak level, as compared to the returns of targets at the aimpoint. In this section examination of range variations neglect the effects of radar signal gains and losses. This is because aimpoints are specified in both range and angle for time delay steering by equations B.3 or B.4. Targets which are offset from the aimpoint in range produce time offsets between received pulses resulting in output pulse broadening and peak reduction; and effect seen previously in angularly offset targets. This effect is analogous to the defocussing phenomena of conventional arrays.

In this section, the time offsets between received pulses are developed for targets offset in range from the aimpoint in a similar fashion as that done for angularly offset targets. It is seen that the time offsets between any two pulses are functions of range offset of the target, the range and angle of the aimpoint, and the locations of the transmitters producing the pulses. In addition, the effects of these time offsets are shown using two illustrations. The first shows the peak level reduction of the output signal produced by range offset targets. The second shows that the system sensitivity to range offsets increases as the azimuth angle of the aimpoint approaches $\pm 90°$.

Figure 14:
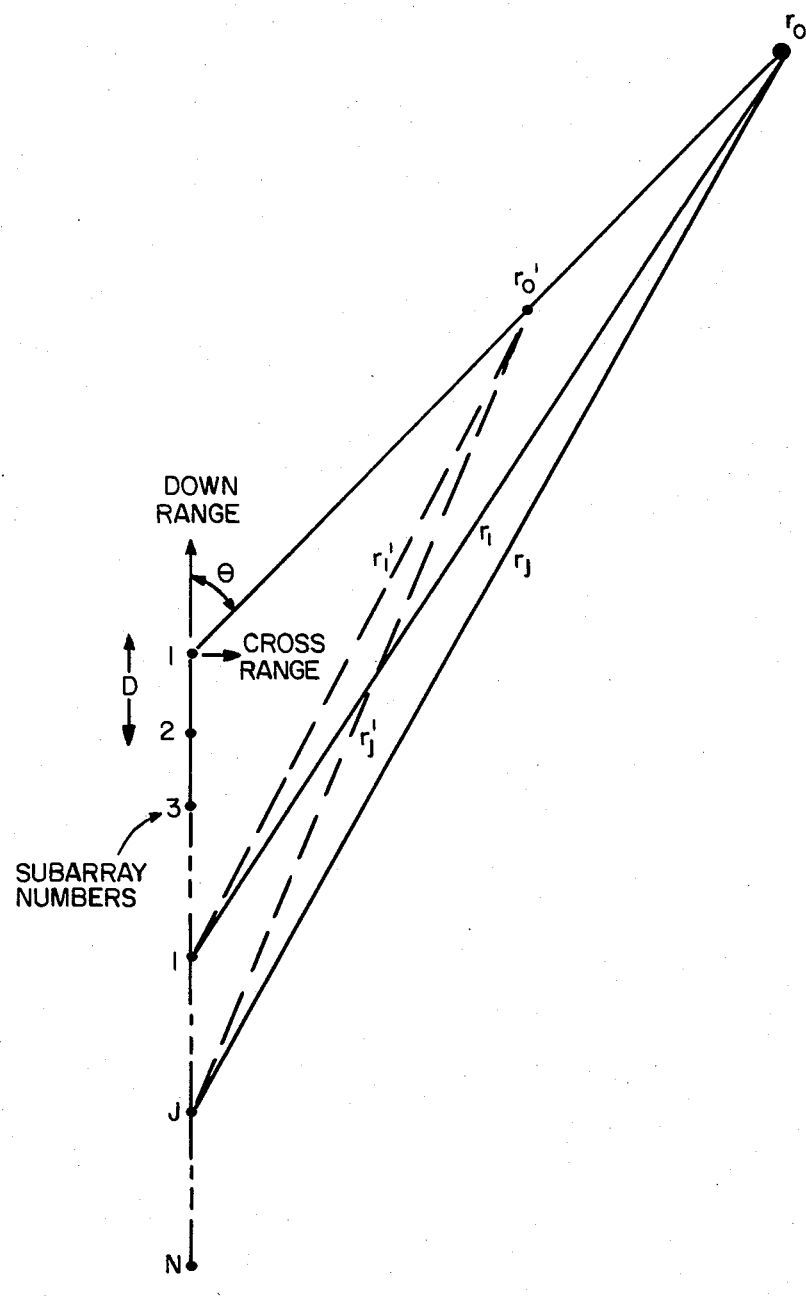
FIG. 14 is a schematic representation of a linear array with range offset targets, and, FIG. 15 is a graphical representation of the linear array geometry shown in three dimensions.

The effects of target range offsets are developed using FIG. 14. In the FIG. 14, a linear array of N subarrays, with a separation distance D, illuminates an aimpoint of range $r_o$ and angle $\theta$. The range to the aimpoint relative to the ith radiator, $r_i$, can be expressed as, $$r_i = [r_o^2 + (Di)^2 + 2r_o Di \cos\theta]^{\frac{1}{2}}$$

where, $r_o$ = Target range measured with respect to the array reference point (subarray #1)
$i$ = Individual array number so that, $$r_i = r_o[1 + X_i]^{\frac{1}{2}} \quad (B.10)$$

where, $$X_i = \frac{(Di)^2 + 2r_o Di \cos\theta}{r_o^2} = \left(\frac{D}{r_o}\right)^2 i^2 + \left(\frac{D}{r_o}\right) 2i \cos\theta.$$

It is assumed that the aimpoint range, $r_o$, is greater than twice the array length, so that equation B.10 can be simplified using the binomial expansion, $$[1 + X_i]^{\frac{1}{2}} = 1 + \frac{X_i}{2} - \frac{X_i^2}{8} + \frac{X_i^3}{16} \ldots$$

so that, $$r_i \approx r_o\left[1 + \frac{X_i}{2} - \frac{X_i^2}{8}\right] \quad (B.11)$$

Rewriting $r_i$ in terms of $(D/r_o)$ and neglecting all $(D/r_o)$ terms of third order and higher produces, $$r_i \approx r_o + \frac{Di \cos\theta + (D \sin\theta)^2 i^2}{2r_o} \quad (B.12)$$

Therefore, for $r_o > 2D$ the range of the aimpoint relative to the ith subarray, $r_i$, is nonlinearly dependent upon the range of the aimpoint relative to the array reference, $r_o$, and the location of the ith subarray, $iD$.

The effect of a target which is offset in range from the aimpoint is to produce a range offset at the ith subarray. This offset can be determined from the partial derivative of $r_i$ taken with respect to the reference range $r_o$, $$\frac{\partial r_i}{\partial r_o} \approx 1 - \frac{(D \sin\theta)^2 i^2}{2r_o^2}. \quad (B.13)$$

It is assumed that the target is offset in range from the aimpoint along a line extending from the aimpoint to the array reference; targets can be at either shorter or longer ranges than the aimpoint. Therefore, a target at range $r_o'$ and an aimpoint at range $r_o$ (FIG. 14) produces a range offset at the ith subarray, $\Delta r_i$, given by, $$\Delta r_i = r_i - r_i' \approx \left[1 - \frac{(D \sin\theta)^2 i^2}{2r_o^2}\right] \Delta r_o \quad (B.14)$$

where, $r_i'$ = Target range relative to the ith subarray
$\Delta r_o = r_o - r_o'$ and $$\Delta \bar{r}_o = \frac{r_o + r_o'}{2}$$

The range offset $\Delta r_i$ is the range difference, relative to the ith subarray, between the aimpoint and target location. Since the aimpoint range is used to establish system time delays, the target return from the ith subarray is received at a time different from what is expected using aimpoint calculations; the time difference is linearly related to the range offset $\Delta r_i$. To establish the time offset between any two target return pulses, the range offset at two subarrays are compared. If the range offsets are not equal to the subarrays, then a time offset between their return pulses occurs.

The range offsets produced at the ith and jth subarrays, where the subarrays are any two of the linear array of FIG. 14, are derived from equation B.14 above. Thus, $$\Delta r_i \approx \left[1 - \frac{(D \sin\theta)^2 i^2}{2\bar{r}_o^2}\right] \Delta r_o \quad (B.15a)$$

$$\Delta r_j \approx \left[1 - \frac{(D \sin\theta)^2 j^2}{2\bar{r}_o^2}\right] \Delta r_o \quad (B.15b)$$

where $\Delta r_i$, $\Delta r_j \approx$ range offsets produced at the ith and jth subarrays, respectively.

The difference between these range offsets can be expressed as, $$\Delta r_{ij} = \Delta r_i - \Delta r_j \approx \left[-\left(\frac{D}{\bar{r}_o}\right)^2 \left(\frac{i^2 - j^2}{2}\right) \sin^2\theta\right] \Delta r_o \quad (B.16)$$

Since $\Delta r_{ij}$ represents the difference in the range offsets between the ith and jth subarrays, a non-zero $\Delta r_{ij}$ results in a time offset between the received pulses of the ith and jth transmit pulses. The time offset, $\tau d_{ij}$, resulting from $\Delta r_{ij}$, can be expressed as, $$\tau d_{ij} = \frac{\Delta r_{ij}}{c} \approx \frac{\Delta r_o}{c}\left[-\left(\frac{D}{\bar{r}_o}\right)^2\left(\frac{i^2 - j^2}{2}\right)\sin^2\theta\right] r_o \quad (B.17)$$

where, c = speed of light.

Thus, the time offset between adjacent pulses i and i+1 given by $$\tau d_{i,i+1} \approx \frac{\Delta r_o}{c} \left[ -\left(\frac{D}{r_o}\right)^2 \left(i + \frac{1}{2}\right) \sin^2\theta \right] \quad \text{(B.18)}$$

As a result of this time delay difference, a target at a range offset from the aimpoint produces a misalignment of receive pulses in time and causes the output pulse shape to widen and be reduced in peak level; this effect was previously observed for targets offset in angle. However, targets offset in range produce pulse time offsets which are nonlinearly related to the array configuration, indicated by the $i^2$ and $j^2$ terms in equation B.17, as opposed to a linear relation in targets offset in angle. The peak reduction effects are shown in the simulation responses shown in Table B-2.

In Table B-2, DPAR is used to produce simulated output peak responses for a linear array of 60 subarrays each separated by 10 nmi. This array illuminates an aimpoint at a range of 2,000 nmi and at an azimuth of 20° using a 1 μsec CW pulse. The target is located at 20° azimuth and its range is varied. The results of Table B-2 show that as the difference between the target and aimpoint ranges increase, the time offset between pulses increases, and the response level is reduced.

A 2000 nmi aimpoint range is used in Table B-2 because it is the detection range of the actual system. There is no need to use the long range aimpoint (i.e., 10,000 nmi aimpoint range) of Section B.1.2 since the examination of range offset targets assumes only that the aimpoint range is greater than twice the subarray separation distance, $r_o >> 2D$. The 20° aimpoint azimuth and 1 μsec transmit pulsewidth used in Table B-2 were arbitrarily selected.

It must be kept in mind that the results of Table B-2 show only the dependence of peak output power on target range offset. What is not shown is the dependence of range resolution on target range offset. Range resolution is dependent upon the pulsewidth of the output signal which is omitted from the table. The dependency of output pulsewidths on targets offsets from aimpoint will be discussed with respect to the circular array configuration.

TABLE B-2

Output Peak Level Reduction for Range Offset Targets

| Aimpoint Range (nmi) | Target Range (nmi) | Output Peak Level (dB) |
|---|---|---|
| 2000 | 2000 | 0.0 dB |
| 2000 | 1950 | −2.64 dB |
| 2000 | 1900 | −5.97 dB |
| 2000 | 1850 | −8.13 dB |
| 2000 | 1800 | −9.66 dB |
| 2000 | 1750 | −10.86 dB |
| 2000 | 1700 | −11.84 dB |
| 2000 | 1600 | −13.44 dB |
| 2000 | 1500 | −14.74 dB |

TABLE B-3

Angle Effects for Range Offset Targets

| Aimpoint Range (nmi) | Target Range (nmi) | Aimpoint & Target Angle (deg) | Output Peak Level (dB) |
|---|---|---|---|
| 2000 | 1900 | 0° | 0.0 |
| 2000 | 1900 | 10° | −1.29 dB |
| 2000 | 1900 | 20° | −5.97 dB |
| 2000 | 1900 | 30° | −9.83 dB |
| 2000 | 1900 | 40° | −12.28 dB |

Time offsets produced by range offsets targets also shows a dependency on the aimpoint angle, as do angular offset targets. This is indicated by the term $\sin^2\theta$ in equations B.17 and B.18. The sensitivity of the time offset to target range offsets increases as $\theta$ approach ±90° which magnifies the pulse broadening and peak reduction effects. This angular dependency on peak response levels is shown in Table B-3.

In Table B-3, DPAR is used to produce peak responses for a linear array of 60 isotropic radiators with separation distances of 10 nmi. These radiators illuminate both an aimpoint at 2,000 nmi and a target at 1,900 nmi with a variation in azimuth angle using a 1 sec CW pulse. The results of Table B-3 show the increased sensitivity to range offset targets as a reduction in peak level as approaches 90°.

Finally, time offsets produced by range offset targets show a dependency on the aimpoint range, as evident by the term $(D/r_o^2)$ in equations B.17 and B.18. This indicates that the sensitivity of the system to range offset targets increases as the aimpoint range decreases. Conversely, for long range aimpoints, $(D/r_o)^2$ approaches zero so that range offset targets produce no time offsets between pulses and produce the same output signal waveform as targets at aimpoint.

In summary, the effect of range offset targets is to generate time offsets between received pulses causing nonsimultaneous arrival of pulses at the targets and producing an output signal of reduced peak amplitude and wider pulsewidth than that of a target at the aimpoint. This result occurs for both linear and circular arrays. In addition, the time offsets created are dependent upon aimpoint range and azimuth. Though both these dependencies are array configuration dependent, the azimuth angle dependency can be eliminated through the use of a circular array configuration while the range dependency can only be reduced.

A brief description of the circular array configuration herein follows. As opposed to the linear array, where mathematical analysis is used extensively, computer simulation is the principle method by which the performance of the circular array is developed. The principles of operation for the circular array are an extension of those developed for the linear array so that, a few modifications to account for the array shape, the mathematical background of the linear array will correspond to the circular array.

The characteristics of the circular array configuration is herein briefly described. The circular array configuration provides performance characteristics that eliminate target ambiguities and target return processing which is independent of aimpoint azimuth. In addition, the nuclear survivability of the circular array is equivalent to that of the linear array. The characteristics of the circular array are presented in comparison with those of the simple linear array.

Figure 15:
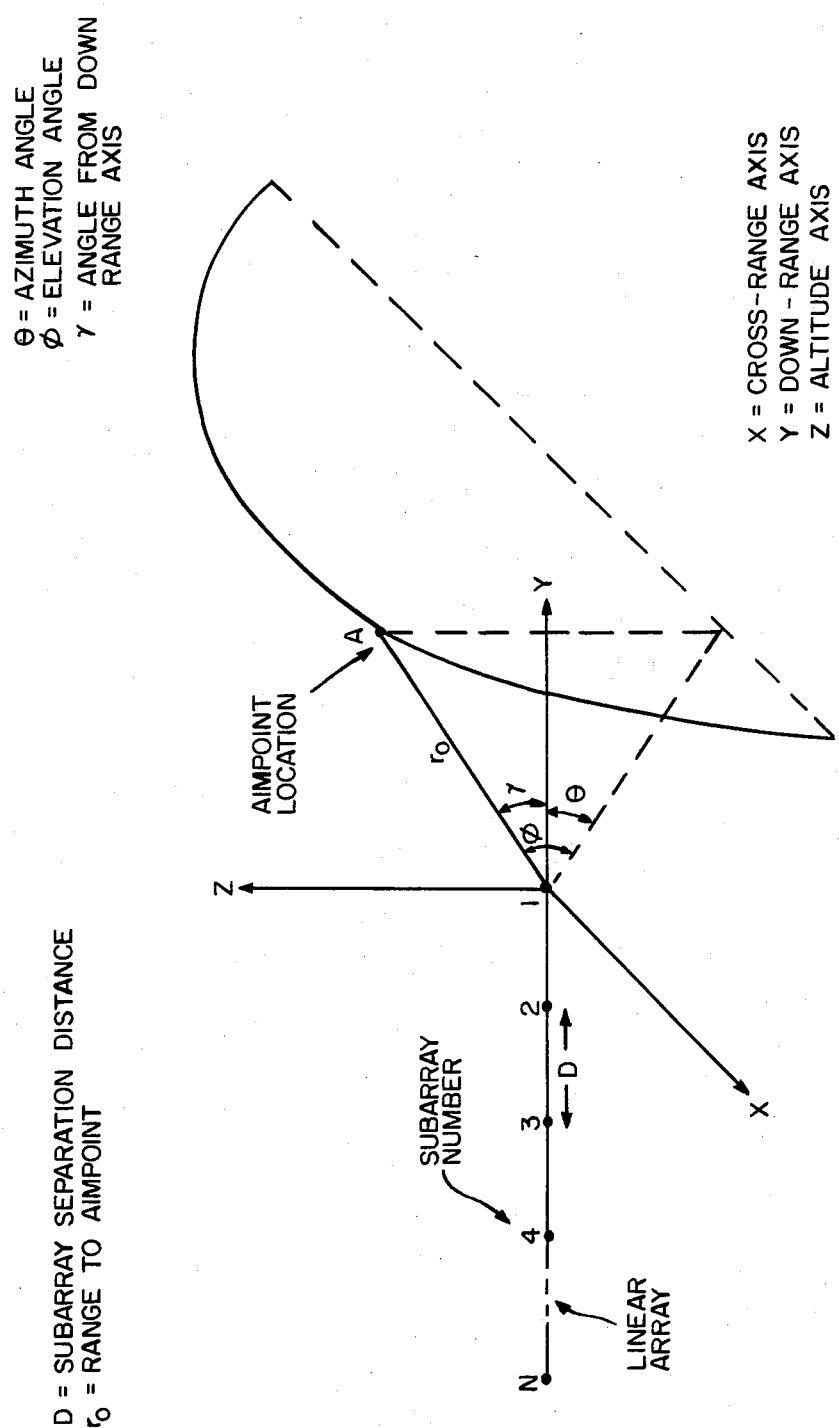

To understand the criteria used for selection of the circular radar configuration, the distributed array characteristics developed for the simple, linear array are applied to a target located in three dimensioned space as shown in FIG. 15. In FIG. 15, a linear array of N isotropic radiators, each separated by a distance D, illuminates an aimpoint location A at range $r_o$, azimuth angle $\theta$, and elevation angle $\phi$, using a CW pulse. Assuming the long range condition, $r_o >> DN$, the time delays for each subarray are calculated using equation B.4 with the angle $\gamma$ as the offset angle. The angle $\gamma$ is defined as the angle between the down range axis of the array and the range vector from the array reference origin to the aimpoint.

$$\gamma = \cos^{-1} [\cos \theta \cos \phi] \quad (B.19)$$

where,
$\theta$ = azimuth angle
$\phi$ = elevation angle.

An expression for the time delay $T_{Di}$ can be derived from equations B.19 and B.4 as, $$T_{Di} \approx D(N-i) \cos \gamma = D(N(N-i) \cos \theta \cos \phi \quad (B.20)$$

where,
$T_{Di}$ = Transmit time delay required at the ith subarray.

Thus, all points in space at range $r_o$ and angle $\gamma$ are illuminated along with aimpoint A. The points of equal $r_o$ and $\gamma$ are shown in FIG. 15 as the semi-circular locus of points drawn through point A. This means each target is ambiguous over a semi-circular ring in space defined by target range $r_o$ and angle $\gamma$.

The large extend of such target ambiguity precludes any reasonable radar operation. To reduce this ambiguity, directive subarrays can be used instead of the isotropic radiators. This reduces the ambiguity by reducing the size of the illuminated space to a subarray beamwidth, centered at the aimpoint. The ambiguity is thus kept within the space of a beamwidth. The trade-off for the reduced ambiguity is increased subarray size and cost. An alternative approach to solve the ambiguity is to use an array configuration having dimensions in both down-range and cross-range. A two dimensional array eliminates the ambiguity since a point in space, X, offset from a plane in space can be completely described by the distances from X to three non-colinear points in a plane. It is inconsequential that the three distances below, since the presence of the ground prevents illumination of the point X'. Thus, a given set of transmit time delays used by a two dimensional array configuration, which consists of a minimum of 3 non-colinear points, produces a set of transmit pulses which arrive simultaneously at a single, unambiguous point in space (i.e., the aimpoint). The degree to which points other than the aimpoint are partially illuminated is dependent upon the specific array configuration.

Although the invention has been described with reference to a particular embodiment, it will be understood to those skilled in the art that the invention is capable of a variety of alternative embodiments within the spirit and scope of the appended claims.

What is claimed is:

1. A survivable ground base sensor apparatus comprising in combination:
a plurality of radiating elements encased in a first hardened enclosure means, each of said plurality of radiating elements cooperating to form a steerable subarray means, a predetermined number of said subarray means are arranged in a predetermined geometric configuration to form a phased-array radar system, each subarray means being spaced at least ten nautical miles from each other, said first hardened enclosure means being located above ground, and
a plurality of electronics means each encased in a second hardened enclosure means, said plurality of second hardened enclosure means being located below ground, each of said plurality of electronic means operatively connected to its corresponding subarray means, each subarray means transmits a single pulse at a different frequency in time sequence that adds coherently to form a beam with a predetermined azimuth and range, the time of transmission is adjusted so that all of the n pulses arrive at a target in time coincidence, when a target is at this range and azimuth, n time coincident pulses are reflected back to each subarray means, each subarray means utilizing a receiver that contains n separate channels tuned to the n frequencies that are transmitted by each of said subarrays means, n is defined as a positive integer greater than one, each of said subarray means comprises a self-contained, small phased array radar means, said electronic means receiving other signal returns and performing non-coherently time-delay processing of all the target return signals to perform target detection.

2. A survivable ground base sensor apparatus as described in claim 1 wherein said first hardened enclosure means is a concrete pyramid wherein said plurality of radiating elements are flush with one surface thereof.

3. A survivable ground base sensor apparatus as described in claim 1 wherein said predetermined geometric configuration is substantially a straight line in which each of said subarray means are spaced a predetermined distance apart.

4. A survivable ground base sensor apparatus as described in claim 1 wherein said predetermined geometric configuration is substantially a circle in which each of said subarray means are spaced a predetermined distance apart.

5. A survivable ground base sensor apparatus as described in claim 1 wherein said predetermined number of subarray means exceeds 20.

6. A survivable ground base sensor apparatus as described in claim 1 wherein said predetermined number of subarray means equals 60.

7. A survivable ground base sensor apparatus as described in claim 3 wherein said predetermined distance is equal to or exceeding 10 nautical miles.

8. A survivable ground base sensor apparatus as described in claim 4 wherein said predetermined distance is equal to or exceeding 10 nautical miles.

9. A survivable ground base sensor apparatus as described in claim 4 wherein said circle has a radius equal to or exceeding 100 nautical miles.

* * * * *